US006775608B2

(12) United States Patent
Yasui

(10) Patent No.: US 6,775,608 B2
(45) Date of Patent: Aug. 10, 2004

(54) AIR-FUEL RATIO CONTROL USING VIRTUAL EXHAUST GAS SENSOR

(75) Inventor: Yuji Yasui, Wako (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 12 days.

(21) Appl. No.: 10/349,966

(22) Filed: Jan. 24, 2003

(65) Prior Publication Data

US 2003/0139874 A1 Jul. 24, 2003

(30) Foreign Application Priority Data

Jan. 24, 2002 (JP) ....................................... 2002-015762

(51) Int. Cl.[7] .............................. B60T 7/12; G05D 1/00
(52) U.S. Cl. .......................................... 701/109; 60/276
(58) Field of Search ................................ 701/106, 108, 701/109, 103; 73/118.1, 117.3; 60/274–277, 285

(56) References Cited

U.S. PATENT DOCUMENTS 5,568,799 A * 10/1996 Akazaki et al. ............. 123/480

FOREIGN PATENT DOCUMENTS

JP 9-72235 3/1997
JP 2913282 4/1999

* cited by examiner

*Primary Examiner*—Willis R. Wolfe
*Assistant Examiner*—Johnny H. Hoang
(74) *Attorney, Agent, or Firm*—Squire, Sanders & Dempsey L.L.P.

(57) ABSTRACT

A controller for controlling an air-fuel ratio of an engine is provided. An exhaust gas sensor is provided between an upstream catalyst disposed upstream of an exhaust pipe and a downstream catalyst disposed downstream of the exhaust pipe. A virtual exhaust gas sensor is configured downstream of the downstream catalyst. After an operating state in which the air-fuel is lean is cancelled, or after a fuel cut is cancelled, an estimated output of the virtual exhaust gas sensor is estimated based on a gas amount that contributes to reduction of the upstream and downstream catalysts and a detected output of the exhaust gas sensor provided between the upstream and downstream catalysts. The air-fuel ratio of the engine is controlled in accordance with the estimated output of the virtual exhaust gas sensor. Thus, the catalyst converter is appropriately reduced in accordance with a load of the engine and a state of the catalyst. When the reduction process is completed, an adaptive air-fuel ratio control based on the output of the exhaust gas sensor is started.

33 Claims, 13 Drawing Sheets

AIR-FUEL RATIO CONTROL USING VIRTUAL EXHAUST GAS SENSOR

BACKGROUND OF THE INVENTION

FIELD OF THE INVENTION

The invention relates to a controller for controlling an air-fuel ratio of an internal combustion engine, and more particularly, to a controller for controlling an air-fuel ratio of an internal combustion engine to optimally reduce oxygen excessively absorbed by a catalyst converter.

A catalyst converter for purifying exhaust gas is provided in an exhaust system of an internal combustion engine of a vehicle. When the air-fuel ratio of air-fuel mixture introduced to the engine is lean, the catalyst converter oxidizes HC and CO by excessive oxygen included in the exhaust gas. When the air-fuel ratio is rich, the catalyst converter reduces Nox by HC and CO. When the air-fuel ratio is in the stoichiometric air-fuel ratio region, HC, CO and Nox are simultaneously and effectively purified.

On the other hand, a method for stopping fuel supply when a vehicle is decelerating (for example, when engine braking is used) is known. Such stopping of fuel supply is generally called a “fuel cut”. The fuel cut allows fuel efficiency to be improved. The fuel cut is performed, for example, when a throttle valve is totally closed over a predetermined period or longer and the engine rotational speed is greater than a predetermined rotational speed. If the engine rotational speed is below the predetermined rotational speed, or if the throttle valve is opened, fuel supply is resumed.

Since fuel is not supplied during the fuel cut, a large amount of oxygen is introduced and absorbed by the catalyst converter. If the catalyst converter absorbs excessive oxygen, the performance of the catalyst, especially the capability of reducing Nox deteriorates. In order to remove the oxygen absorbed by the catalyst converter, a method for making the air-fuel mixture rich when the fuel supply is resumed is proposed.

Japanese Patent Application Unexamined Publication No. 9-72235 describes a method for feedforward controlling the air-fuel ratio after a fuel cut or lean state is returned to a normal fuel supply state. More specifically, the mass of substances absorbed by the catalyst converter is estimated during the fuel cut or lean state based on output of an air-fuel ratio sensor provided upstream of the catalyst converter. When the fuel cut or lean state is cancelled, the air-fuel ratio is feedforward-controlled to reduce the estimated mass of the absorbed substances.

Japanese Patent Publication No.2913282 discloses a method for determining a target air-fuel ratio for making the fuel mixture rich and a period during which the target air-fuel ratio is maintained. The determination is performed based on the duration of the lean state or fuel cut, and an engine load and engine rotational speed during the lean state or fuel cut. After the lean state or fuel cut is cancelled, the air-fuel ratio is controlled so that the target air-fuel ratio is maintained for the determined period.

Furthermore, a scheme for providing an O2 sensor (exhaust gas sensor) downstream of the catalyst converter is known. When the fuel cut is cancelled, the target air-fuel ratio is set to be rich. A reduction process for the catalyst is started. When the output of the O2 sensor is inverted from a value indicative of lean to a value indicative of rich, the reduction process for the catalyst is stopped.

The mass of substances absorbed by the catalyst varies depending on operating conditions of the engine. If a load of the engine varies, the mass of the absorbed substances also varies. Therefore, it is difficult to precisely determine the mass of the absorbed substances during the fuel cut or lean state.

If the catalyst deteriorates with time, the capability of absorbing oxygen is degraded. After the fuel cut or lean state is cancelled, if the air-fuel mixture is made rich under such degradation, the air-fuel mixture may be made excessively rich. Such an excessive rich state increases HC and CO emissions.

Thus, the feedforward control of the air-fuel ratio is unstable against variations in operating conditions of the engine and variations in degradation of the catalyst. The feedforward control may degrade the purification performance of the catalyst.

There exists dead time in combustion cycles of the engine and transportation through the exhaust system. It takes some time from adjustment of an amount of fuel injection based on a target air-fuel ratio determined from the output of an O2 sensor until the result of the fuel injection is reflected in the output of the O2 sensor. Therefore, if a process for making the air-fuel ratio rich is stopped in synchronization with the inversion of the O2 sensor provided downstream of the catalyst from lean to rich, the catalyst may be excessively reduced. As a result, the amount of HC and CO emissions is increased.

Therefore, there is a need for air-fuel ratio control that performs a reduction process that is stable against variations in a load of the engine after a lean state or fuel cut is cancelled. Furthermore, there is another need for air-fuel ratio control that performs a reduction process in accordance with deterioration of the catalyst. There is yet another need for air-fuel ratio control that prevents the air-fuel ratio from being made excessively rich after a lean state or fuel cut is cancelled.

SUMMARY OF THE INVENTION

According to one aspect of the invention, an exhaust gas sensor is provided between an upstream catalyst disposed upstream of an exhaust manifold and a downstream catalyst disposed downstream of the exhaust manifold. A virtual exhaust gas sensor is virtually provided downstream of the downstream catalyst. When a lean state is cancelled or when a fuel cut is cancelled, the controller estimates an output of the virtual exhaust gas sensor based on a gas amount that contributes to reduction of the upstream and downstream catalysts, and an output of the exhaust gas sensor. First air-fuel ratio control controls the air-fuel ratio of the internal combustion engine in accordance with the estimated output.

According to the invention, it is possible to control a purification atmosphere (oxidation atmosphere and reduction atmosphere) of the downstream catalyst that can not be directly observed by the exhaust gas sensor provided between the upstream and downstream catalysts. The reduction process for the downstream catalyst is appropriately and stably performed based on the estimated output of the virtual exhaust gas sensor. Thus, the purification rate of Nox after the lean state or fuel cut is cancelled can be quickly returned to an optimal rate.

According to another aspect of the invention, the gas amount that contributes to reduction of the upstream and downstream catalysts is determined based on an operating condition of the engine. Therefore, a variation in the load of the engine after a lean state or fuel cut is cancelled, a variation in the duration of a lean state or fuel cut, a variation in the air-fuel ratio during a lean state or fuel cut, and a variation in deterioration of the catalysts are compensated. As a result, the purification rate of Nox after a lean state or fuel cut is cancelled can be stably returned. Furthermore, the air-fuel ratio is prevented from being made excessively rich caused by an excessive reduction process, avoiding increasing the amount of HC and CO emissions.

According to another aspect of the invention, when a lean state is cancelled or when a fuel cut is cancelled, the controller changes a target air-fuel ratio to a predetermined rich value. The gas amount that contributes to the reduction of the upstream and downstream catalysts is determined based on the amount of the change in the target air-fuel ratio. According to one embodiment, the target air-fuel ratio is controlled to change from a stoichiometric state (stoichiometric air-fuel ratio) to a predetermined rich state. In this case, the gas amount that contributes to the reduction of the upstream and downstream catalysts is determined based on a difference between the target air-fuel ratio and the stoichiometric air-fuel ratio. Since the air-fuel ratio that contributes to the reduction of the catalysts is taken into consideration, the accuracy of the estimation of the output of the virtual exhaust gas sensor is improved.

According to another aspect of the invention, the estimated output of the virtual exhaust gas sensor is expressed by a binary digit indicating lean or rich with respect to a predetermined value. Thus, a computational load for estimating the output of the virtual exhaust gas sensor is reduced. The predetermined value is, for example, the stoichiometric air-fuel ratio.

According to another aspect of the invention, the estimated output of the virtual exhaust gas sensor is a future value. The future value temporally precedes a value that would be detected by the virtual exhaust gas sensor if the virtual exhaust gas sensor were actually mounted downstream of the downstream catalyst. Since the air-fuel ratio is controlled in accordance with the future value, an excessive reduction process caused by dead time included in combustion cycles and transportation through the exhaust manifold is prevented.

According to another aspect of the invention, the controller further performs second air-fuel ratio control for controlling the air-fuel ratio based on the output of the exhaust gas sensor provided between the upstream and downstream catalysts. The second air-fuel ratio control allows functions of the upstream and downstream catalysts to be effectively and selectively used, implementing the optimal purification rate of the catalysts. The first air-fuel ratio control and second air-fuel ratio control are switched in accordance with a predetermined condition. The predetermined condition includes a condition in which the estimated output of the virtual exhaust gas sensor is inverted from lean to rich. When the reduction process for the catalysts in a state in which the air-fuel ratio is enriched is ended, the first air-fuel ratio control is completed, and the second air-fuel ratio control is started.

The second air-fuel ratio control allows deleterious substances to be effectively removed by the upstream and the downstream catalysts. The first air-fuel ratio control allows a large amount of oxygen absorbed by the catalyst converter during a lean state or fuel cut to be effectively reduced. Therefore, the catalysts are prevented from deteriorating due to an oxidation atmosphere while the purification rate of the catalysts are optimally maintained.

According to another aspect of the invention, the second air-fuel ratio control has an integration term in a manipulated quantity for manipulating the air-fuel ratio. The calculation of the integration term is prohibited when the air-fuel ratio is controlled by the first air-fuel ratio control. That is, while the reduction process for the catalysts is performed, the integration term is held. Thus, when the second air-fuel ratio control is resumed, the air-fuel ratio control is prevented from becoming unstable due to an excessively increased integration term.

According to another aspect of the invention, the second air-fuel ratio control identifies a parameter used to determine the air-fuel ratio in each cycle. The identification of the parameter is prohibited when the first air-fuel ratio control is performed. When the second air-fuel ratio control is resumed, the air-fuel ratio control is prevented from becoming unstable due to an improper parameter.

According to another aspect of the invention, the second air-fuel ratio control further limits a manipulated quantity for manipulating the air-fuel ratio within a predetermined range. The second air-fuel ratio control variably updates the predetermined range in accordance with the manipulated quantity. The update of the predetermined range is prohibited when the first air-fuel ratio control is performed. Thus, when the second air-fuel ratio control is resumed, it is avoided that the exhaust gas sensor can not be controlled toward a predetermined target value because of the manipulated quantity limited by an improper predetermined range. It is avoided that the purification rate of the catalysts is extremely impaired.

According to another aspect of the invention, the controller accumulates gas amounts that contribute to the reduction of the upstream and downstream catalysts in respective cycles. A gas amount for reducing the upstream catalyst is determined in response to the inversion of the output of the exhaust gas sensor provided between the upstream and downstream catalysts. A total gas amount necessary to reduce both the upstream and downstream catalysts is determined based on the determined gas amount for reducing the upstream catalyst. The output of the virtual exhaust gas sensor is manipulated to indicate a completion of the first air-fuel ratio control if the accumulated gas amounts reach the determined total gas amount. Thus, both the upstream and downstream catalysts are appropriately reduced. The purification rate of Nox after a lean state or fuel cut is cancelled can be quickly and stably returned.

BRIEF DESCRIPTION OF THE DRAWINGS

FIG. 2(*b*) shows behavior of an upstream catalyst and a downstream catalyst in accordance with one embodiment of the invention.

DESCRIPTION OF THE PREFERRED EMBODIMENTS

Structure of Internal Combustion Engine and Controller

Figure 1:
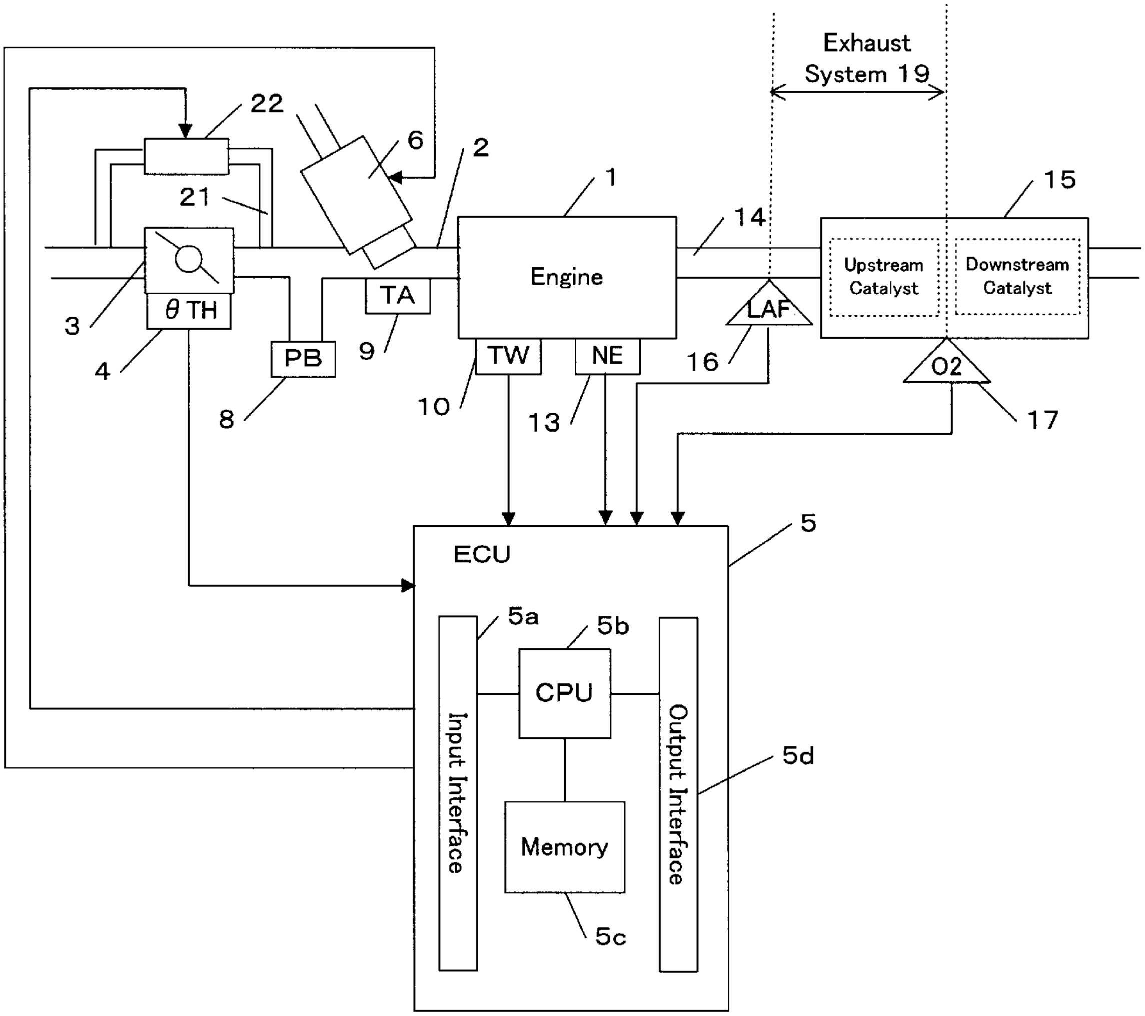
FIG. 1 is a schematic block diagram showing an internal combustion engine and its controller in accordance with one embodiment of the invention.

Preferred embodiments of the present invention will be described referring to the attached drawings. FIG. 1 is a block diagram showing a controller of an internal-combustion engine (hereinafter referred to as an engine) in accordance with one embodiment of the invention.

An electronic control unit (hereinafter referred to as an ECU) 5 comprises an input circuit 5*a* for receiving data sent from each part of the engine 1, a CPU 5*b* for carrying out operations for controlling each part of the engine 1, a storage device 5*c* including a read only memory (ROM) and a random access memory (RAM), and an output circuit 5*d* for sending control signals to each part of the engine 1. Programs and various data for controlling each part of the vehicle are stored in the ROM. A program for performing air-fuel ratio control for the engine according to the invention, data and tables used for operations of the program are stored in the ROM. The ROM may be a rewritable ROM such as an EEPROM. The RAM provides work areas for operations by the CPU 5*a*, in which data sent from each part of the engine 1 as well as control signals to be sent out to each part of the engine 1 are temporarily stored.

The engine is, for example, an engine equipped with four cylinders. An intake manifold 2 is connected to the engine 1. A throttle valve 3 is disposed upstream of the intake manifold 2. A throttle valve opening (θ TH) sensor 4, which is connected to the throttle valve 3, outputs an electric signal corresponding to an opening angle of the throttle valve 3 and sends it to the ECU 5.

A bypass passage 21 for bypassing the throttle valve 3 is provided in the intake manifold 2. A bypass valve 22 for controlling the amount of air to be supplied into the engine 1 is provided in the bypass passage 21. The bypass valve 22 is driven in accordance with a control signal from the ECU 5.

A fuel injection valve 6 is provided for each cylinder at an intermediate point in the intake manifold 2 between the engine 1 and the throttle valve 3. The fuel injection valve 6 is connected to a fuel pump (not shown) to receive fuel supplied from a fuel tank (not shown). The fuel injection valve 6 is driven in accordance with a control signal from the ECU 5.

An intake manifold pressure (Pb) sensor 8 and an outside air temperature (Ta) sensor 9 are mounted in the intake manifold 2 downstream of the throttle valve 3. The detected intake manifold pressure Pb and outside air temperature Ta are sent to the ECU 5.

An engine water temperature (TW) sensor 10 is attached to the cylinder peripheral wall, which is filled with cooling water, of the cylinder block of the engine 1. The temperature of the engine cooling water detected by the TW sensor is sent to the ECU 5.

A rotational speed (Ne) sensor 13 is attached to the periphery of the camshaft or the periphery of the crankshaft (not shown) of the engine 1, and outputs a CRK signal pulse at a predetermined crank angle cycle (for example, a cycle of 30 degrees) that is shorter than a TDC signal pulse cycle issued at a crank angle cycle associated with a TDC position of the piston. The CRK pulses are counted by the ECU 5 to determine the rotational speed Ne of the engine 1.

An exhaust manifold 14 is connected to the engine 1. The engine 1 discharges exhaust gas through the exhaust manifold 14. A catalyst converter 15 removes deleterious substances such as HC, CO, and Nox included in exhaust gas flowing through the exhaust manifold 14. The catalyst converter 15 comprises two catalysts, an upstream catalyst and a downstream catalyst.

A full range air-fuel ratio (LAF) sensor 16 is provided upstream of the catalyst converter 15. The LAF sensor 16 linearly detects the concentration of oxygen included in exhaust gas over a wide air-fuel ratio zone, from the rich zone where the air/fuel ratio is richer than the stoichiometric air/fuel ratio to an extremely lean zone. The detected oxygen concentration is sent to the ECU 5.

An O2 (exhaust gas) sensor 17 is provided between the upstream catalyst and the downstream catalyst. The O2 sensor 17 is a binary-type of exhaust gas concentration sensor. The O2 sensor outputs a high level signal when the air-fuel ratio is richer than the stoichiometric air-fuel ratio, and outputs a low level signal when the air-fuel ratio is leaner than the stoichiometric air-fuel ratio. The electric signal is sent to the ECU 5.

Signals sent to the ECU 5 are passed to the input circuit 5*a*. The input circuit 5*a* converts analog signal values into digital signal values. The CPU 5*b* processes the resulting digital signals, performs operations in accordance with the programs stored in the ROM, and creates control signals. The output circuit 5*d* sends these control signals to actuators for a bypass valve 22, fuel injection valve 6 and other mechanical components.

Figure 2:
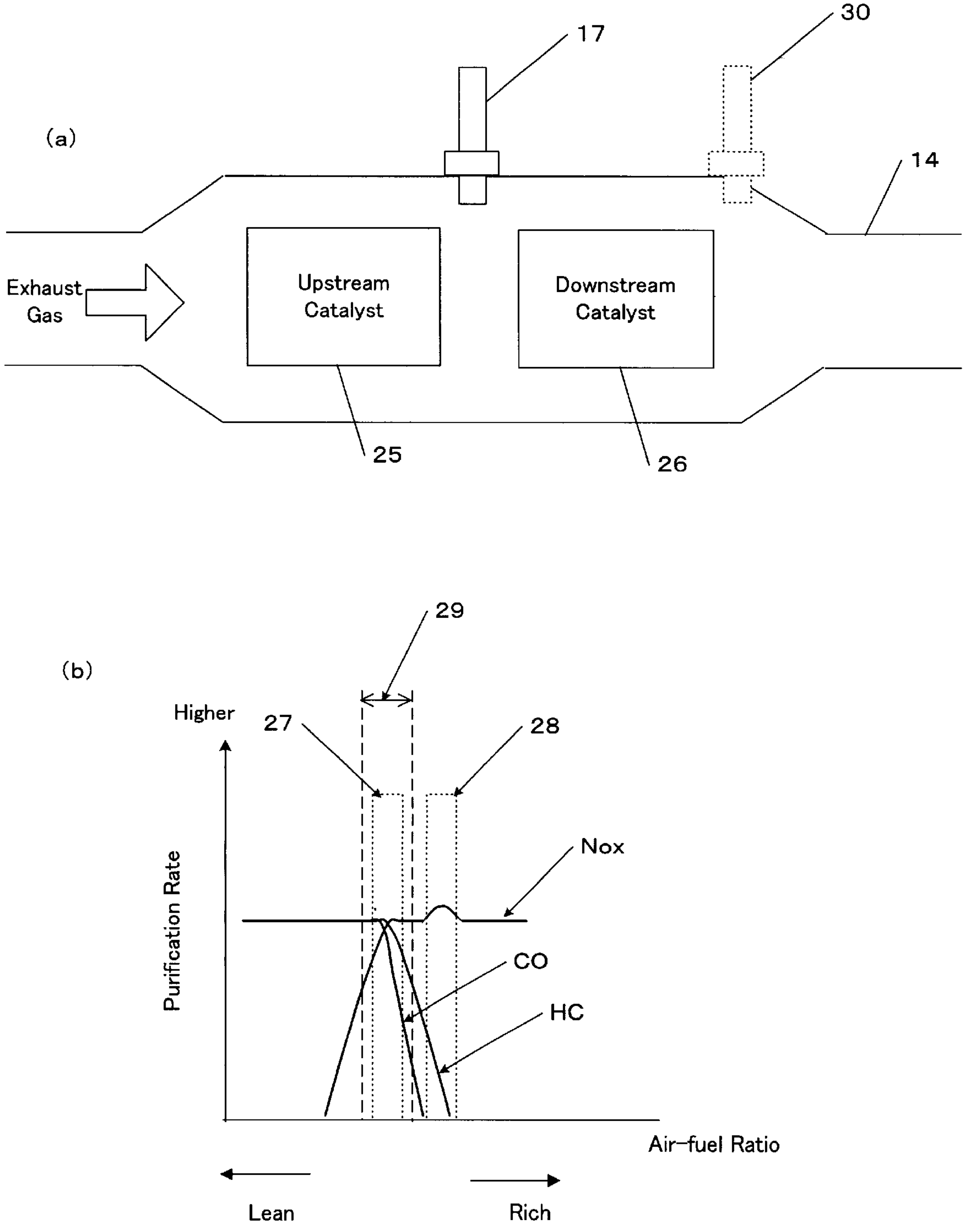
FIG. 2(*a*) shows a catalyst converter in accordance with one embodiment of the invention.

FIG. 2(*a*) shows a structure of the catalyst converter 15. The catalyst converter 15 comprises the upstream catalyst 25 and the downstream catalyst 26. Exhaust gas introduced into the exhaust manifold 14 passes through the upstream catalyst 25 and then through the downstream catalyst 26.

It is known that it is easier to maintain a purification rate of Nox at an optimal level by air-fuel ratio control based on output of an O2 sensor provided between the upstream and downstream catalysts, compared with air-fuel ratio control based on output of an O2 sensor provided downstream of the downstream catalyst. Therefore, in the embodiment of the invention, the actual O2 sensor 17 is provided between the upstream and downstream catalysts. The O2 sensor 17 detects the concentration of oxygen included in exhaust gas after the passage through the upstream catalyst.

A reference number 30 indicates a virtual O2 sensor. The virtual O2 sensor 30 is a virtually provided sensor in the exhaust manifold 14. The sensor does not physically exist. An air-fuel ratio controller according to the invention estimates a value that would be detected by the O2 sensor 30 if the O2 sensor 30 were actually provided downstream of the downstream catalyst 26. The estimated output of the virtual O2 sensor 30 indicates the concentration of oxygen included in exhaust gas after the passage through the downstream catalyst 26.

FIG. 2(*b*) shows purification behavior of the upstream catalyst and the downstream catalyst. A window 27 shows an air-fuel ratio region in which CO, HC and Nox are optimally purified. In the upstream catalyst 25, oxygen included in exhaust gas is consumed in the purification. Therefore, the exhaust gas supplied to the downstream catalyst 26 exhibits a reduction atmosphere (i.e., a rich state) as shown by a window 28. In such a reduction atmosphere, Nox is further purified. Thus, the cleaned exhaust gas is discharged.

In order to optimally maintain the purification performance of the catalyst converter 15, adaptive control of the air-fuel ratio according to the invention causes the output of the O2 sensor 17 to converge to a target value so that the air-fuel ratio is within the window 27.

A reference number 29 shows an allowable range that defines a limit of a quantity manipulated by the adaptive air-fuel ratio control, which will be described in detail later.

Overview of Air-fuel Ratio Control

Figure 3:
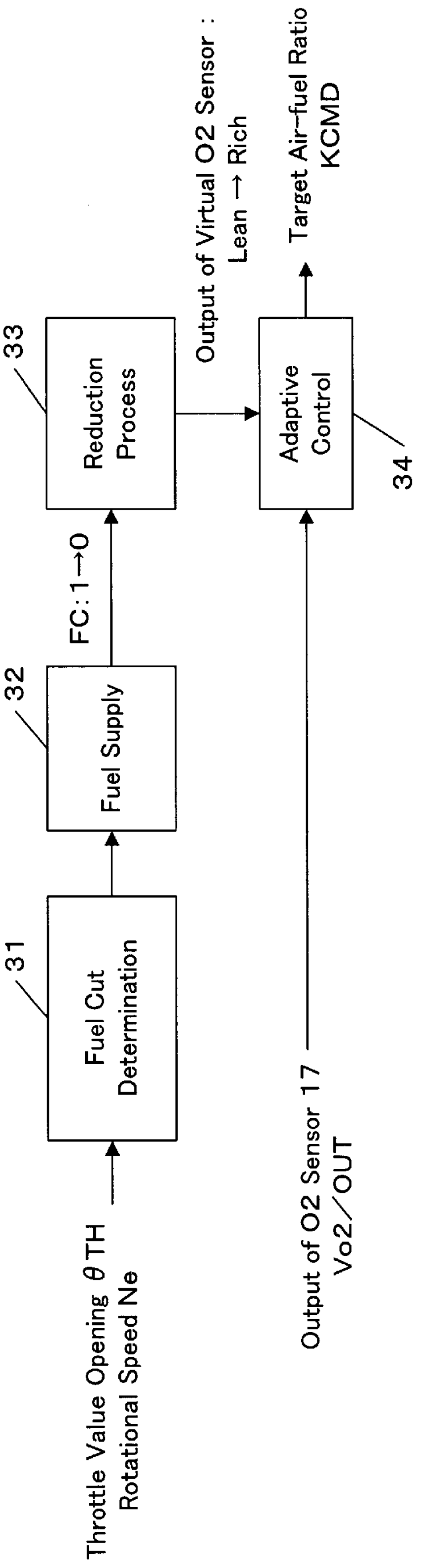
FIG. 3 is a functional block diagram of an air-fuel ratio controller in accordance with one embodiment of the invention.

FIG. 3 shows a general structure of a controller for controlling the air-fuel ratio in accordance with one embodiment of the invention. A fuel cut determination part 31 receives an opening θTH of the throttle valve detected by the throttle valve opening sensor 4 and rotational speed Ne detected by the rotational speed sensor 13 (FIG. 1). When the throttle valve is totally closed over a predetermined period or longer and the rotational speed is equal to or greater than a predetermined rotational speed, the fuel cut determination part 31 sets a fuel cut flag to 1. If the fuel cut flag is set to 1, a fuel supply part 32 sends a control signal to the fuel injection valve to stop supplying fuel.

When the rotational speed Ne is below the predetermined rotational speed or the throttle valve is opened after the fuel cut is started, the fuel cut determination part 31 sets the fuel cut flag to zero. If the fuel cut flag is set to zero, the fuel supply part 32 sends a control signal to the fuel injection valve to resume supplying fuel.

When the fuel cut flag is changed from 1 to zero, a catalyst reduction mode is started by a reduction process part 33. The reduction process part 33 estimates an output of the virtual O2 sensor 30 (FIG. 2(*a*)). The output of the virtual O2 sensor 30 is determined in accordance with calculations described later. The output of the virtual O2 sensor 30 is expressed by a binary digit indicating lean or rich. Since the output of the virtual O2 sensor is a binary digit, a computational load for estimating the output of the virtual O2 sensor is reduced. Alternatively, the output of the virtual O2 sensor may be expressed by a multiple value.

When the output of the virtual O2 sensor 30 indicates lean, the reduction process part 33 enriches the air-fuel ratio to perform the reduction process. When the output of the virtual O2 sensor 30 is inverted from lean to rich, the reduction process part 33 terminates the reduction process.

Thus, in the catalyst reduction mode, the air-fuel ratio is controlled based on the estimated output of the virtual O2 sensor 30. Therefore, the reduction process of the downstream catalyst is stably performed. As a result, the purification rate of Nox after the fuel cut is cancelled can be quickly and stably returned.

The inversion of the output of the virtual O2 sensor 30 from lean to rich indicates that the reduction process for the downstream catalyst is completed. The air-fuel ratio control by the reduction process part 33 is completed, and air-fuel ratio control by an adaptive control part 34 is started. The adaptive control part 34 determines a target air-fuel ratio KCMD so that the output of an output Vo2/OUT of the O2 sensor 17 converges to the target value.

It is preferable that the shift of the air-fuel ratio control from the reduction process part 33 to the adaptive control part 34 is performed when a future value of the output of the virtual O2 sensor 30 is inverted. The future value precedes the estimated output of the virtual O2 sensor 30 by a predetermined time. The reason for setting such a future value is as follows. In the catalyst reduction mode, the target air-fuel ratio is established based on the estimated output of the virtual O2 sensor 30. The amount of fuel supply is adjusted to make the current air-fuel ratio equal to the target air-fuel ratio. It takes a certain time until the result of such fuel supply is reflected in the estimated output of the virtual O2 sensor 30. Such a certain time is called a "dead time". In order to compensate the dead time, the future value that precedes by the dead time the estimated output of the virtual O2 sensor 30 is used.

While the reduction process is performed by the reduction process part 33, the air-fuel ratio control by the adaptive control part 34 is not performed. In order to prevent the air-fuel ratio control from becoming unstable when the adaptive control for the air-fuel ratio is resumed, some of the calculations performed by the adaptive control part 34 are prohibited. More specifically, 1) the calculation of an integration term included in the control input into an object to be controlled is prohibited, 2) an identification process of model parameters is prohibited, and 3) updating an allowable range that defines a limit of a quantity for manipulating the air-fuel ratio is prohibited. Details thereof will be described later.

Figure 4:
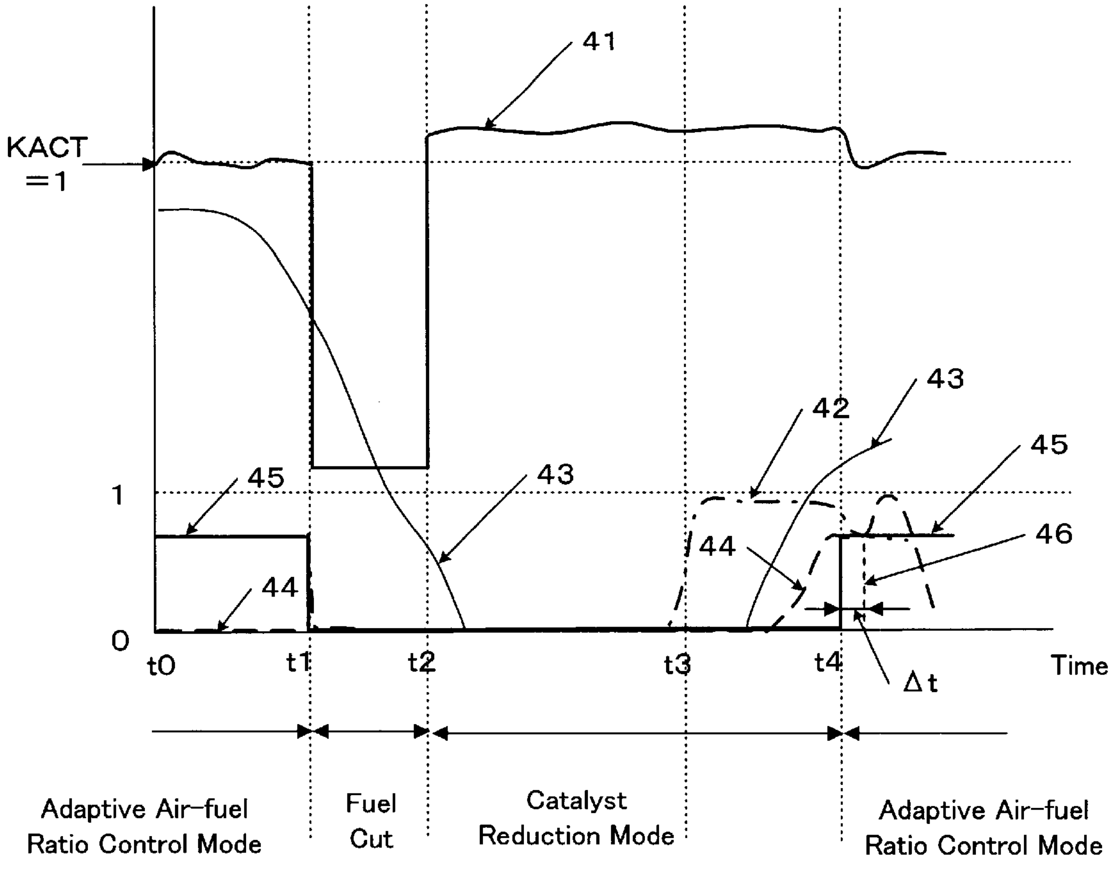
FIG. 4 schematically shows behavior of air-fuel ratio control in accordance with one embodiment of the invention.

FIG. 4 shows behavior of parameters in the air-fuel ratio control according to one embodiment of the invention. Reference number 41 indicates transition of an actual air-fuel ratio coefficient KACT. The actual air-fuel ratio coefficient KACT indicates an air-fuel ratio detected by the LAF sensor 16 (FIG. 1). When the air-fuel ratio is the stoichiometric air-fuel ratio, the actual air-fuel ratio coefficient KACT has a value of 1. When the actual air-fuel ratio coefficient KACT is greater than 1, the air-fuel ratio is rich. When the actual air-fuel ratio coefficient KACT is less than 1, the air-fuel ratio is lean. Reference number 42 indicates transition of the output of the O2 sensor 17. Reference number 43 indicates transition of vehicle speed.

Reference number 44 indicates transition of the amount of Nox emissions. Reference number 45 indicates the future value of the estimated output of the O2 sensor 30. For the sake of clarity, the estimated output of the virtual O2 sensor is shown by reference number 46. It is seen that the future value precedes by a predetermined time Δt the estimated output value. As described above, "Δt" corresponds to the dead time in combustion cycles and the exhaust system.

For a time period from t0 to t1, the air-fuel ratio is controlled by the adaptive control part 34. The adaptive control allows deleterious HC, CO and Nox to be optimally purified. The upstream and downstream catalysts are maintained in the stoichiometric atmosphere.

The vehicle speed is decelerated. The fuel cut for improving fuel efficiency is started at t1. Since no fuel is supplied during the fuel cut, the actual air-fuel ratio coefficient KACT and the O2 sensor output indicate lean. A large amount of oxygen is absorbed by both the upstream catalyst and downstream catalyst during the fuel cut. The upstream and downstream catalysts exhibit an oxidation atmosphere.

The fuel cut is cancelled at t2. In response to the cancellation of the fuel cut, a control mode is shifted to the catalyst reduction mode. In the catalyst reduction mode, the air-fuel ratio is set to a predetermined rich value. When the mode enters the catalyst reduction mode, removal of oxygen absorbed by the upstream catalyst is started. The upstream catalyst gradually moves toward the stoichiometric atmosphere.

When the reduction process for the upstream catalyst 25 is completed at t3, the output of the O2 sensor 17 is inverted from lean (value 0) to rich (value 1) as shown by reference number 42. The reduction process continues irrespective of the inversion of the output of the O2 sensor 17. The upstream catalyst moves toward a reduction atmosphere. The downstream catalyst moves toward the stoichiometric atmosphere.

The future value of the virtual O2 sensor 30 is inverted from lean (value 0) to rich (value 1) at t4. This indicates that the reduction process for the downstream catalyst 26 is almost completed. In response to the inversion of the future value of the virtual O2 sensor 30, a process for enriching the air-fuel ratio is ended. The downstream catalyst at this time exhibits the stoichiometric atmosphere.

The control mode of the air-fuel ratio is shifted from the catalyst reduction mode to the adaptive control mode at t4. The adaptive control mode allows the upstream and downstream catalysts to be maintained in the stoichiometric atmosphere.

Thus, the reduction process is completed in response to the inversion of the future value that precedes by time $\Delta t$ corresponding to the dead time the estimated output of the virtual O2 sensor 30. Therefore, it is avoided that the air-fuel ratio is made excessively rich.

Catalyst Reduction Mode

Figure 5:
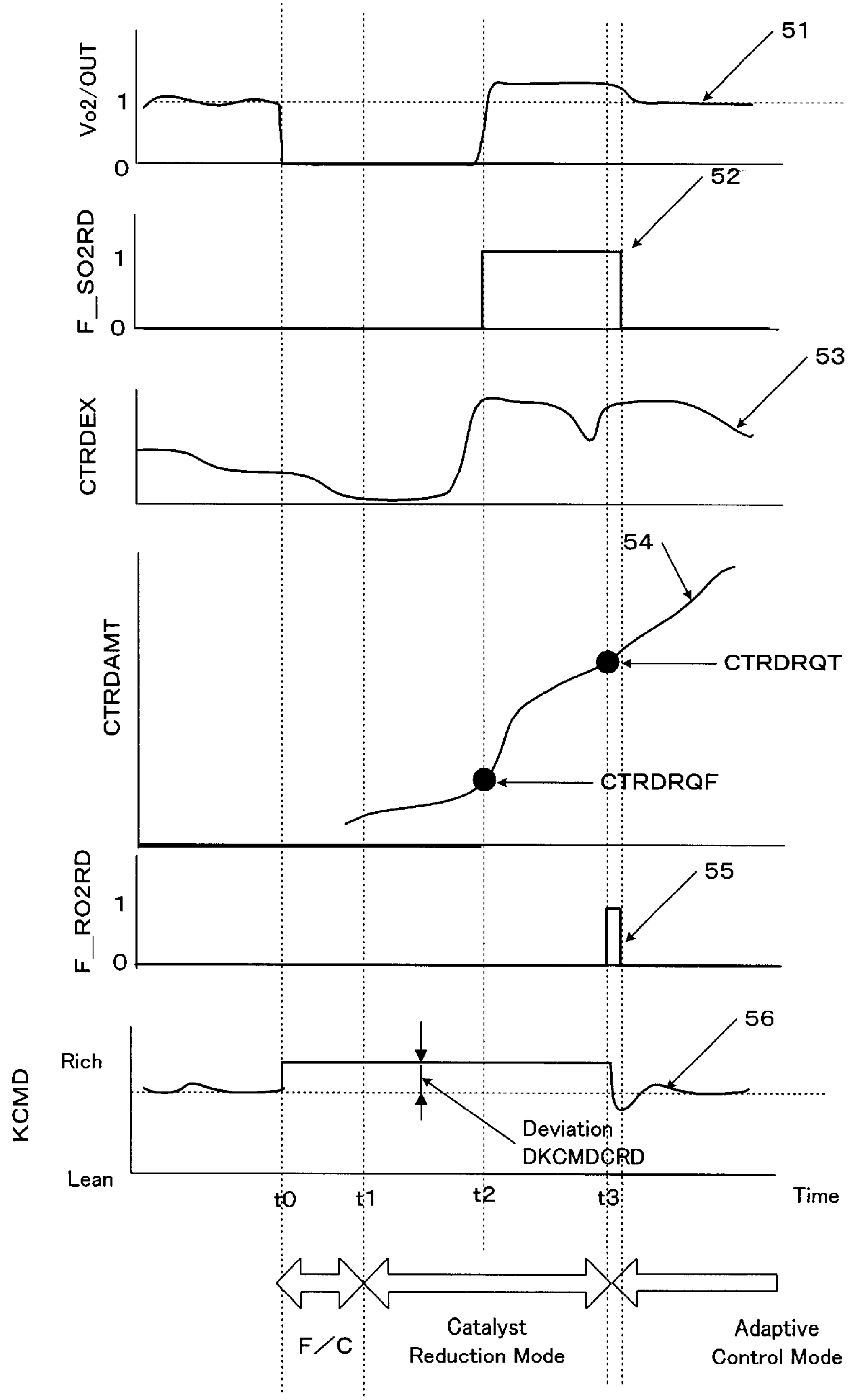
FIG. 5 schematically shows transition of parameters in a catalyst reduction mode in accordance with one embodiment of the invention.

FIG. 5 shows details of the catalyst reduction mode shown in FIG. 4. Reference number 51 indicates transition of the output Vo2/OUT of the O2 sensor 17. Reference number 52 indicates transition of an O2 sensor flag F_SO2RD indicating whether the reduction process for the upstream catalyst is completed. When the reduction process of the upstream catalyst is completed, the O2 sensor flag F_SO2RD is inverted from zero to 1.

Reference number 53 indicates transition of an estimated reduction gas amount CTRDEX. The estimated reduction gas amount CTRDEX indicates the amount of gas that contributes to the reduction of the catalyst converter 15, and is determined based on an operating condition of the engine. Reference number 54 indicates transition of an accumulated value CTRAMT. The accumulated value CTRAMT indicates a value obtained by accumulating the estimated reduction gas amounts CTRDEXs determined in respective cycles. Reference number 55 indicates transition of the future value F_RO2RD of the virtual O2 sensor 30. Reference number 56 indicates transition of the target air-fuel ratio KCMD.

The fuel cut is performed for a time period from t0 to t1. When the fuel cut is cancelled at t1, the catalyst reduction mode is started. The target air-fuel ratio KCMD is set to a predetermined value indicative of rich. In the example, the predetermined value is set to a value obtained by adding a deviation DKCMDCRD to the target air-fuel ratio indicative of stoichiometry (that is, KCMD=1). The estimated value CTRDEX of the reduction gas is determined in each cycle and the integrated value CTRAMT of the reduction gas is updated in each cycle.

The reduction process for the upstream catalyst is completed at t2. In response to the completion, the output Vo2/OUT of the O2 sensor 17 is inverted from lean to rich. The O2 sensor flag F_SO2RD is switched from zero to 1. The accumulated value CTRAMT at t2 indicates a gas amount CTRDRQF that contributes to the reduction of the upstream catalyst 25. Based on the gas amount CTRDRQF, a total gas amount CTRDRQT required to achieve the reduction of both the upstream catalyst 25 and downstream catalyst 26 is determined.

The accumulated value CTRAMT reaches the determined total gas amount CTRDRQT at t3. In response to this, a value of the future value F_RO2RD of the virtual O2 sensor 30 is switched from zero to 1. In response to the inversion of the future value, the catalyst reduction mode is ended.

Thus, the air-fuel ratio is controlled in accordance with the estimated output (preferably, the future value of the estimated output) of the virtual O2 sensor during the catalyst reduction mode. If the output of the virtual O2 sensor is lean, the air-fuel ratio is set to a predetermined rich value. If the output of the virtual O2 sensor is inverted from lean to rich, a process for enriching the air-fuel ratio is ended.

Figure 6:
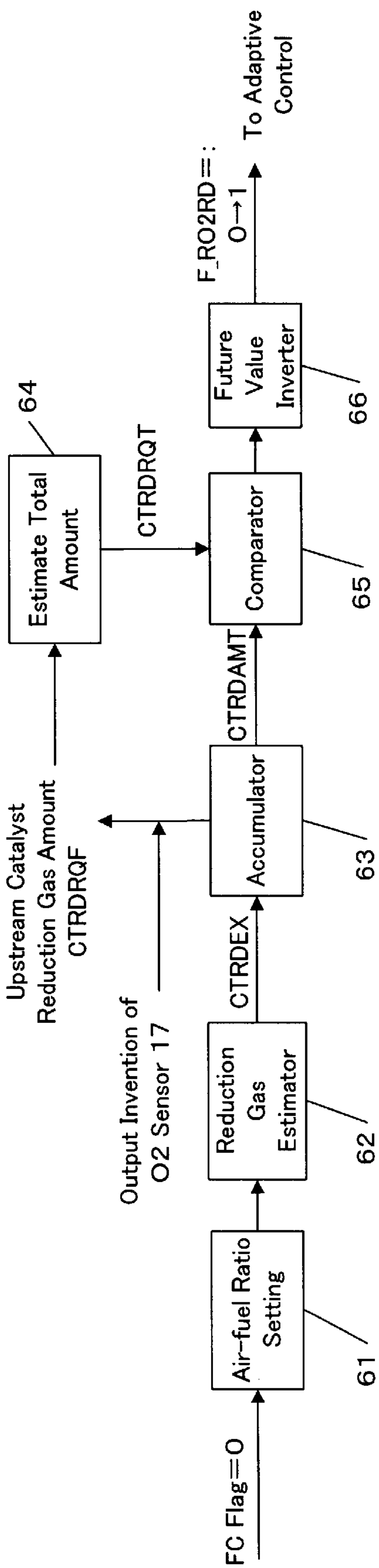
FIG. 6 is a detailed functional block diagram of a reduction process part in accordance with one embodiment of the invention.

FIG. 6 is a detailed functional block diagram of the reduction process part 33 shown in FIG. 3. An air-fuel ratio setting part 61 establishes the target air-fuel ratio KCMD in the catalyst reduction mode in accordance with the equation (1). A reference value FLAF/BASE is set to be a central value in a range of values of the actual air-fuel ratio of the engine 1. For example, the reference value FLAF/BASE is set to a value indicative of stoichiometry (that is, FLAF/BASE=1). As described referring to FIG. 5, DKCMDCRD indicates the deviation from the reference value FLAF/BASE. The deviation DKCMDCRD indicates a level to which the target air-fuel ratio should be enriched in the catalyst reduction, and has a positive value.

$$\text{Target air-fuel ratio } KCMD=FLAF/BASE+DCKMDCRD \quad (1)$$

A reduction gas estimator 62 estimates the exhaust gas amount CTRDEX that contributes to the reduction in accordance with the equation (2). As shown in the equation (2), the gas amount that contributes to the reduction is calculated based on an operating condition of the engine. NE indicates engine rotational speed detected by the NE sensor 13 (FIG. 1). PB indicates intake manifold pressure detected by the PB sensor 8 (FIG. 1). CTRDSVP indicates an estimation coefficient. In the case of a four-cylinder engine of 2.2 liters, the experimental value of the estimation coefficient is 65.74.

$$\text{Estimated gas amount } CTRDEX=NE\times PB\times DKCMDCRD\times CTRDSVP \quad (2)$$

An accumulator 63 accumulates the gas amount estimated by the reduction gas estimator 62 in accordance with the equation (3). “k” is an identifier for identifying a control cycle. (k) indicates the current cycle, and (k−1) indicates the previous cycle.

$$\text{Accumulated value } CTRAMT(k) \text{ in the current cycle=accumulated value } CTRAMT(k-1) \text{ in the previous cycle+estimated gas amount } CTRDEX(k) \quad (3)$$

As described above, when the output of the O2 sensor 17 is inverted from lean to rich, the reduction process for the upstream catalyst is completed. The accumulated value when the output of the O2 sensor 17 is inverted indicates the gas amount CTRDRQF that contributes to the reduction of the upstream catalyst. Deterioration of the upstream catalyst and an oxygen absorption concentration indicating how much oxygen is absorbed are identified by the upstream catalyst reduction gas amount CTRDRQF.

Based on the upstream catalyst reduction gas amount CTRDRQF, the total gas amount CTRDRQT required to reduce both the upstream and downstream catalysts is estimated. A total amount estimator 64 determines the total gas amount CTRDRQT in accordance with the equation (4).

$$\text{Total reduction gas amount } CTRDRQT = \text{upstream catalyst reduction gas amount } CTRDRQF \times CATEVR \tag{4}$$

A coefficient CATEVR is a constant predetermined based on simulation and experiment. More specifically, in simulation and experiment, an O2 sensor is actually provided downstream of the downstream catalyst. After the fuel cut, the air-fuel ratio is set to a rich air-fuel ratio determined by the equation (1). A correlation between the inversion of the output of the O2 sensor and the accumulated value CTRAMT is determined. Based on the correlation, a value of the coefficient CATEVR is determined. Next, the determined coefficient CATEVR is adjusted so that the inversion of the future value F_RO2RD from a value 0 (lean) to a value 1 (rich) is performed a predetermined time earlier than the inversion of the actual O2 sensor provided for the experiment. That is, the determined coefficient CATEVR is adjusted to be smaller so that the amount of HC and CO emissions is not increased due to excessive enrichment. The predetermined time has a length corresponding to the dead time as described above. Thus, the dead time included in combustion cycles and transportation through the exhaust system is compensated.

A comparator 65 compares the total reduction gas amount CTRDRQT determined by the total amount estimator 64 with the accumulated value CTRAMT determined by the accumulator 63. If the accumulated value CTRAMT reaches the total amount CTRDRQT, a future value inverter 66 changes the future value F_RO2RD of the virtual O2 sensor from zero to 1.

In response to the inversion of the future value F_RO2RD of the virtual O2 sensor, the catalyst reduction mode is ended. The air-fuel ratio control by the adaptive control is started. Thus, in the catalyst reduction mode, the output of the virtual O2 sensor 30 is estimated based on the output of the O2 sensor 17. The air-fuel ratio is feedback-controlled based on the estimated output of the virtual O2 sensor 30.

Since the reduction gas amount in each cycle is estimated based on an operating condition of the engine, the reduction process of the catalysts is stably performed irrespective of a variation in the air-fuel ratio during the fuel cut, a variation in an engine load, and a variation in deterioration of the catalysts. Therefore, the purification rate of Nox can be quickly returned. Furthermore, since it is avoided that the reduction process is excessively performed, the amount of HC and CO emissions is prevented from increasing. Since the output of the virtual O2 sensor is estimated based on the air-fuel ratio DKCMDCRD that contributes to the reduction, the accuracy of the estimated output of the virtual O2 sensor is improved.

Adaptive Air-fuel Ratio Control Mode

Figure 7:
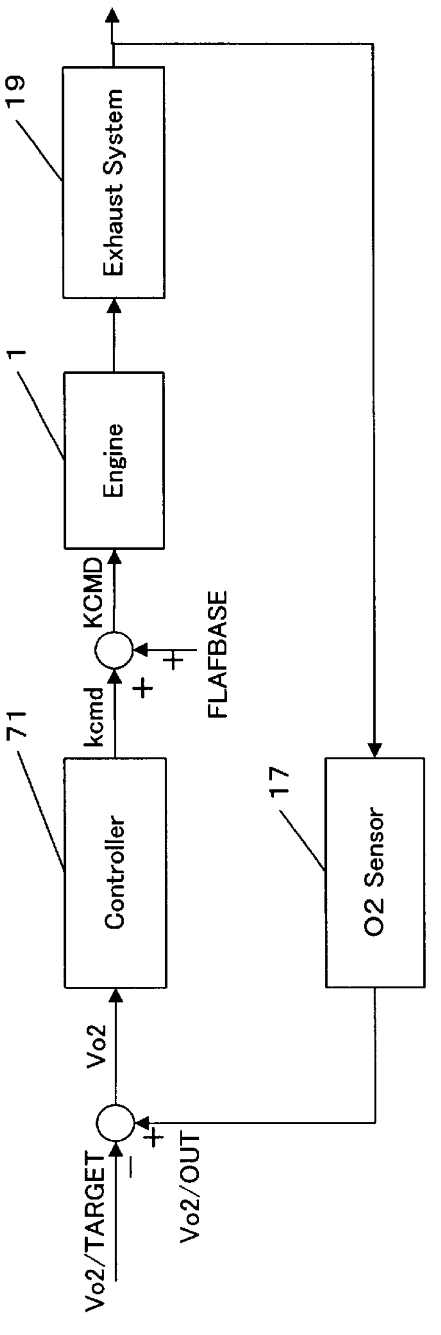
FIG. 7 is a control block diagram of adaptive control in accordance with one embodiment of the invention.

FIG. 7 is a control block diagram of the adaptive air-fuel ratio control. As shown in FIG. 1, an object to be controlled, or a plant of the adaptive air-fuel ratio control is the exhaust system 19 extending from the LAF sensor 16 of the exhaust manifold 14, via the upstream catalyst, to the O2 sensor 17. The output Vo2/OUT of the O2 sensor 17 of the exhaust system 19 is compared with a target value Vo2/TARGET. Based on the comparison result, a controller 71 determines an air-fuel ratio difference kcmd. The air-fuel ratio difference kcmd is added to the reference value FLAF/BASE to determine the target air-fuel ratio KCMD. The amount of fuel corrected by the target air-fuel ratio KCMD is supplied to the engine 1. The output Vo2/OUT of the O2 sensor 17 of the exhaust system is detected again.

Thus, the controller 71 performs feedback control for determining the target air-fuel ratio KCMD to cause the output Vo2/OUT of the O2 sensor 17 to converge to the target value Vo2/TARGET. The exhaust system 19 to be controlled can be modeled using the output Vo2/OUT of the O2 sensor 17 as output and the output KACT of the LAF sensor 16 as input. The exhaust system 19 is modeled as a discrete-time model. The discrete-time model can make the algorithm of the air-fuel ratio control simple and suitable for computer processing. As described above, k is an identifier for identifying a control cycle.

$$Vo2(k+1) = a1\cdot Vo2(k) + a2\cdot Vo2(k-1) + b1\cdot kact(k-d1) \text{ where } Vo2(k) = Vo2/\text{OUT}(k) - Vo2/\text{TARGET} \tag{5}$$

As shown in the equation (5), Vo2 indicates a difference between the output Vo2/OUT of the O2 sensor 17 and the target value Vo2/TARGET, which is hereinafter referred to as a sensor output error. kact indicates a difference between the output KACT of the LAF sensor and the reference value FLAF/BASE. As described referring to the equation (1), the reference value FLAF/BASE of the air-fuel ratio is, for example, set to a value corresponding to the stoichiometric air-fuel ratio.

d1 indicates dead time included in the exhaust system 19. The dead time d1 indicates the time required until the air-fuel ratio detected by the LAF sensor 16 is reflected in the output of the O2 sensor 17. a1, a2 and b1 are model parameters, and are generated by an identifier, which will be described later.

On the other hand, a system, which comprises the engine 1 and the ECU 5, for manipulating the air-fuel ratio is modeled as shown in the equation (6). kcmd indicates a difference between the target air-fuel ratio KCMD and the reference value FLAF/BASE, which is hereinafter referred to as an air-fuel ratio error. d2 indicates dead time in the air-fuel ratio manipulating system. The dead time d2 indicates the time required until the calculated target air-fuel ratio KCMD is reflected in the output KACT of the LAF sensor 16.

$$kact(k) = kcmd(k-d2) \tag{6}$$

Figure 8:
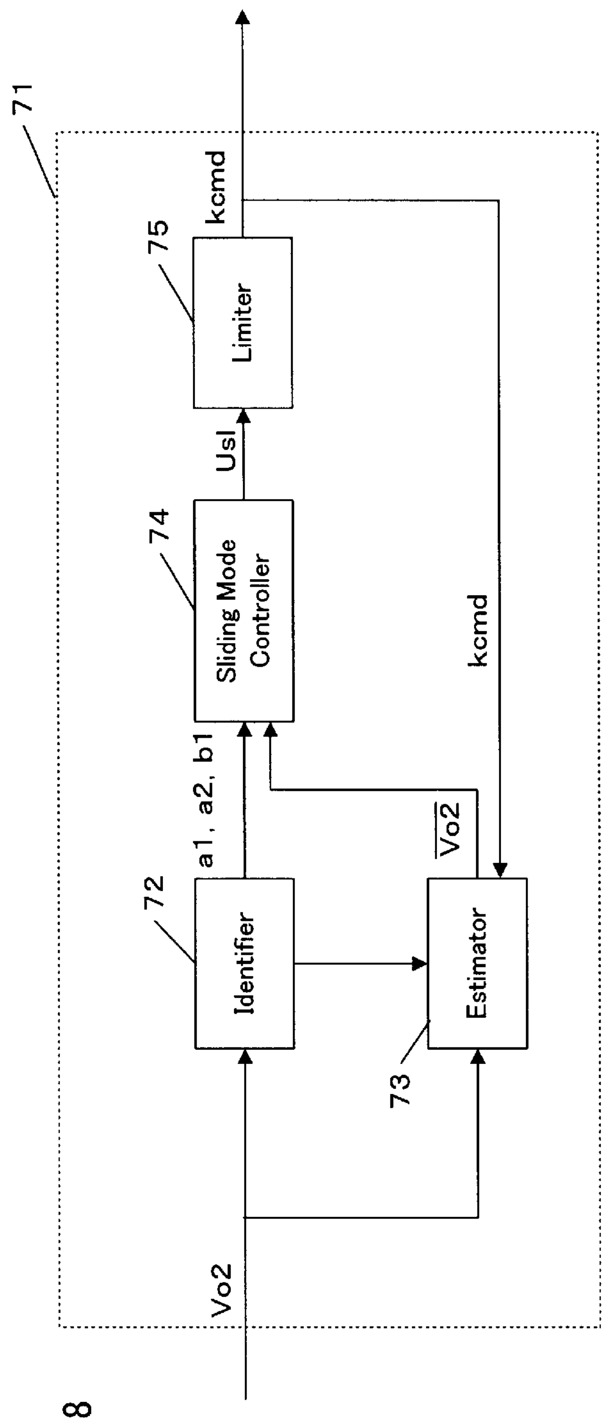
FIG. 8 is a detailed functional block diagram of an adaptive control part in accordance with one embodiment of the invention.

FIG. 8 is a detailed block diagram of the controller 71 shown in FIG. 7. The controller 71 comprises an identifier 72, estimator 73, sliding-mode controller 74 and limiter 75.

The identifier 72 identifies the model parameters a1, a2 and b1 in the equation (5) to eliminate modeling errors. An identification process performed by the identifier 72 will be described.

Model parameters a1(k−1), a2(k−1) and b1(k−1) determined in the previous cycle (these parameters are hereinafter called a1(k−1) hat, a2(k−1) hat and b1(k−1) hat) are used to determine the sensor output error Vo2(k) for the current cycle (this is hereinafter called a sensor output error Vo2(k) hat) in accordance with the equation (7).

$$\hat{Vo2}(k) = \hat{a}1(k-1)\cdot Vo2(k-1) + \hat{a}2(k-1)\cdot Vo2(k-2) + \hat{b}1(k-1)\cdot kact(k-d1-1) \tag{7}$$

The equation (8) indicates an error id/e(k) between the sensor output error Vo2(k) hat determined by the equation (7) and the sensor output error Vo2(k) actually detected in the current cycle.

$$id/e(k)=Vo2(k)-\hat{Vo}2(k) \tag{8}$$

The identifier 72 determines a1(k) hat, a2(k) hat and b1(k) hat for the current cycle so that the error id/e(k) is minimized. A vector Θ is defined as shown in the equation (9).

$$\Theta^T(k)=[\hat{a}1(k)\hat{a}2(k)\hat{b}1(k)] \tag{9}$$

The identifier 72 determines a1(k) hat, a2(k) hat and b1(k) hat in accordance with the equation (10).

$$\Theta(k)=\Theta(k-1)+K\theta(k)\cdot id/e(k) \tag{10}$$

$$\text{where } K\theta(k)=\frac{P(k-1)\xi(k)}{1+\xi^T(k)P(k-1)\xi(k)}$$

$$\xi^T(k)=[Vo2(k-1)\ Vo2(k-2)kact(k-d1-1)]$$

$$P(k)=\frac{1}{\lambda1(k)}\left[I-\frac{\lambda2(k)P(k-1)\xi^T(k)}{\lambda1(k)+\lambda2(k)\xi^T(k)P(k-1)\xi(k)}\right]P(k-1)$$

$$0<\lambda1\le 1\quad 0\le\lambda2<2\quad I:\text{an unit matrix}$$

The estimator 73 estimates the sensor output error Vo2 after the dead time d(=d1+d2) so as to compensate the dead time d1 of the exhaust system 19 and the dead time d2 of the air-fuel manipulating system. The estimation is performed in accordance with the equation (11). Coefficients α1, α2 and β are calculated using model parameters determined by the identifier 72. Past time-series data kcmd(k−j) (wherein, j=1, 2, . . . d) of the air-fuel ratio error includes air-fuel ratio errors obtained during a period of the dead time "d".

$$\overline{Vo2}(k+d)=\alpha1\cdot Vo2(k)+\alpha2\cdot Vo2(k-1)+\sum_{j=1}^{d}\beta j\cdot kcmd(k-j)$$

where

α1=first-row, first-column element of $A^d$

α2=first-row, second-column element of $A^d$

βj=first row elements of $A^{j-1}\cdot B$ $$A=\begin{bmatrix} a1 & a2 \\ 1 & 0 \end{bmatrix} \tag{11}$$

$$B=\begin{bmatrix} b1 \\ 0 \end{bmatrix}$$

Past values kcmd(k−d2), kcmd(k−d2−1), . . . kcmd(k−d) of the air-fuel ratio error kcmd before the dead time d2 can be replaced with the error outputs kact(k), kact(k−1), . . . kact(k−d+d2) by using the equation (2). As a result, the equation (12) is derived.

$$\begin{aligned}\overline{Vo2}(k+d)&=\alpha1\cdot Vo2(k)+\alpha2\cdot Vo2(k-1)+\\&\sum_{j=1}^{d2-1}\beta j\cdot kcmd(k-j)+\sum_{i=0}^{d-d2}\beta_i+d2\cdot kact(k-i)\\&=\alpha1\cdot Vo2(k)+\alpha2\cdot Vo2(k-1)+\\&\sum_{j=1}^{d2-1}\beta j\cdot kcmd(k-j)+\sum_{i=0}^{d1}\beta i+d2\cdot kact(k-i)\end{aligned} \tag{12}$$

The sliding mode controller 74 establishes a switching function σ so as to perform the sliding mode control, as shown in the equation (13).

$$\sigma(k)=s\cdot Vo2(k-1)+Vo2(k) \tag{13}$$

Vo2(k−1) indicates the sensor output error detected in the previous cycle as described above. Vo2(k) indicates the sensor output error detected in the current cycle. "s" is a setting parameter of the switching function s, and is established to satisfy −1<s<1.

The equation in the case of σ(k)=0 is called an equivalent input system, which specifies the convergence characteristics of the sensor output error Vo2, or a controlled quantity. Assuming σ(k)=0, the equation (13) is transformed to the equation (14).

$$Vo2(k-1)=-\frac{1}{s}\cdot Vo2(k) \tag{14}$$

Figure 9:
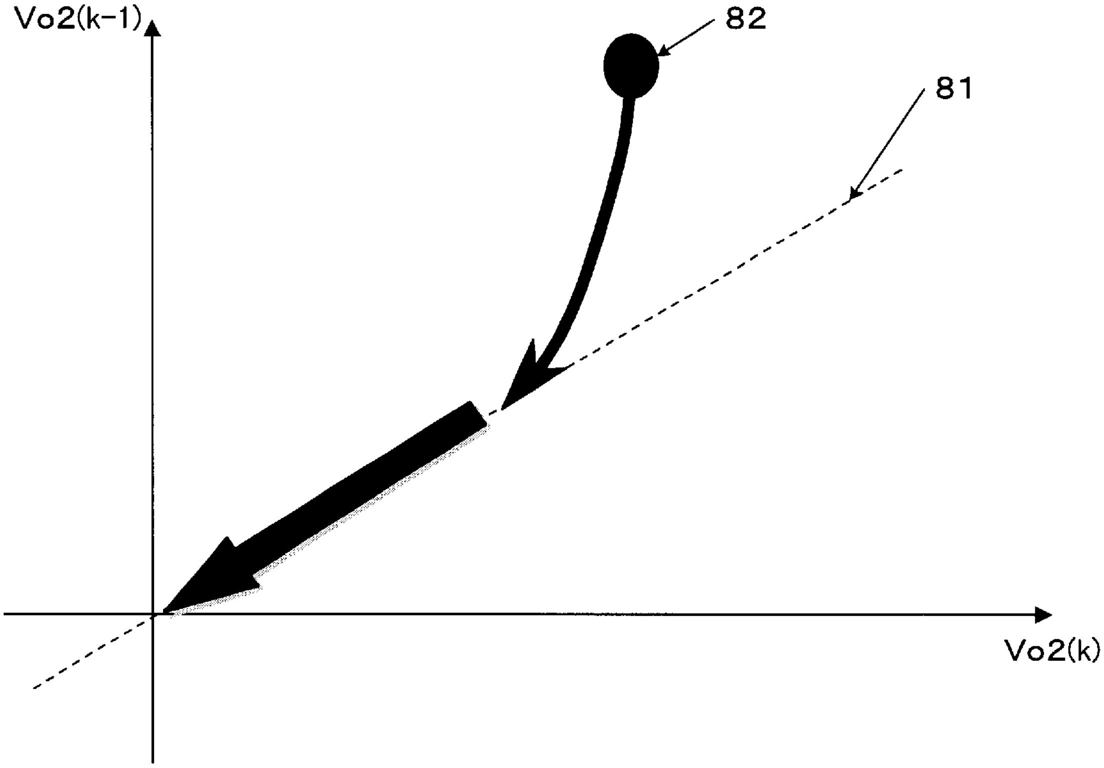
FIG. 9 schematically shows a switching line of sliding mode control in accordance with one the embodiment of the invention.

Now, characteristics of the switching function σ will be described with reference to FIG. 9 and the equation (14). FIG. 9 shows that the equation (14) is shown as a line 81 on a phase space with Vo2(k) on the horizontal axis and Vo2(k−1) on the vertical axis. The line 81 is referred to as a switching line. It is assumed that an initial value of a state quantity (Vo2(k), Vo2(k−1)) that is a combination of Vo2(k) and Vo2(k−1) is shown by a point 82. The sliding mode control operates to place the state quantity shown by the point 82 on the line 81 and then restrain it on the line 81. According to the sliding mode control, since the state quantity is held on the switching line 81, the state quantity can highly stably converge to the origin 0 of the phase space without being affected by disturbances or the like. In other words, by restraining the state quantity (Vo2(k), Vo2(k−1)) on such a stable system having no input shown by the equation (14), the sensor output error Vo2/OUT can converge to the target value Vo2/TARGET robustly against disturbances and modeling errors.

The switching function setting parameter "s" is a parameter which can be variably selected. Reduction (convergence) characteristics of the sensor output error Vo2 can be specified by the setting parameter "s".

Three control inputs are determined to cause the value of the switching function σ to converge to zero. That is, a control input Ueq for restraining the state quantity on the switching line, a control input Urch for placing the state quantity on the switching line, and a control input Uadp for placing the state quantity on the switching line while suppressing modeling errors and disturbances. The three control inputs Ueq, Urch and Uadp are summed to determine a demand error Usl. The demand error Usl is used to calculate the air-fuel ratio error kcmd.

The equivalent control input Ueq needs to satisfy the equation (15) because it is an input for restraining the state quantity onto the switching line.

$$\sigma(k+1)=\sigma(k) \tag{15}$$

The equivalent control input Ueq that satisfies σ(k+1)=σ(k) is determined from the equations (6) and (13), as shown in an equation (16).

$$Ueq(k)=-\frac{1}{b1}[((a1-1)+s)\cdot Vo2(k+d)+(a2-s)\cdot Vo2(k+d-1) \tag{16}$$

The reaching law input Urch having a value that depends on the value of the switching function σ is determined in accordance with the equation (17). In the embodiment, the reaching law input Urch has a value proportional to the value of the switching function σ. Krch indicates a feedback gain of the reaching law, which is predetermined with, for example, simulation in which the stability and the quick response of convergence of the value of the switching function to zero (σ=0) are taken into consideration.

$$Urch(k) = -\frac{1}{b1} \cdot Krch \cdot \sigma(k+d) \tag{17}$$

The adaptive law input Uadp having a value that depends on an integrated value of the switching function σ is determined in accordance with the equation (18). In the embodiment, the adaptive law input Uadp has a value proportional to the integrated value of the switching function σ. Kadp indicates a feedback gain of the adaptive law, which is predetermined with, for example, simulation in which the stability and the quick response of convergence of the value of the switching function to zero (σ=0) are taken into consideration. ΔT indicates the period of a cycle.

$$Uadp(k) = -\frac{1}{b1} \cdot Kadp \cdot \sum_{i=0}^{k+d} (\sigma(i) \cdot \Delta T) \tag{18}$$

Since the sensor output errors Vo2(k+d) and Vo2(k+d−1), and the value σ((k+d) of the switching function include the dead time "d", these values can not be directly obtained. Therefore, the equivalent control input Ueq is determined using an estimated errors Vo2(k+d) bar and Vo2(k+d−1) bar generated by the estimator 73.

$$Ueq(k) = -\frac{1}{b1}[((a1-1)+s) \cdot \overline{Vo2}(k+d) + (a2-s) \cdot \overline{Vo2}(k+d-1)] \tag{19}$$

A switching function σ bar shown in the equation (20) is determined using the estimated errors generated by the estimator 73.

$$\bar{\sigma} = s \cdot \overline{Vo2(k-1)} + \overline{Vo2(k)} \tag{20}$$

The switching function σ bar is used to determine the reaching law input Urch and the adaptive law input Uadp.

$$Urch(k) = -\frac{1}{b1} \cdot Krch \cdot \bar{\sigma}(k+d) \tag{21}$$

$$Uadp(k) = -\frac{1}{b1} \cdot Kadp \cdot \sum_{i=0}^{k+d} (\bar{\sigma}(i) \cdot \Delta T) \tag{22}$$

As shown in the equation (23), the equivalent control input Ueq, the reaching law input Urch and the adaptive law input Uadp are added to determine the demand error Usl.

$$Usl(k) = Ueq(k) + Urch(k) + Uadp(k) \tag{23}$$

The limiter 75 performs a limiting process for the demand error Usl to determine the air-fuel ratio error kcmd. More specifically, if the demand error Usl is within an allowable range, the limiter 75 sets the air-fuel ratio error kcmd to the value of the demand error Usl. If the demand error Usl deviates from the allowable range, the limiter 75 sets the air-fuel ratio error kcmd to an upper or lower limit value of the allowable range.

As shown by reference number 29 in FIG. 2(*b*), the allowable range used by the limiter 75 is set to a range whose center is almost located in the window 27 and whose width is wider than that of the window 27. The allowable range is actively established in accordance with the demand error Usl, an operating condition of the engine and the like. Even when the purification capability of the catalyst converter deviates from the optimal state shown by the window 27, the allowable range has a sufficient width to allow the catalyst converter to quickly return to the optimal state while suppressing a variation in combustion conditions that may be caused by a variation in the air-fuel ratio. Therefore, the purification rate of the catalyst converter can be kept at high level, reducing deleterious substances of exhaust gas.

More specifically, the allowable range is variably updated in accordance with the determined demand error Usl. For example, the allowable range is extended in accordance with deviation of the demand error Usl from the allowable range. On the other hand, when the demand error Usl is within the allowable range, the allowable range is reduced. Thus, the allowable range suitable for the demand error Usl, which defines the air-fuel ratio necessary to cause the output of the O2 sensor 17 to converge to the target value, is established.

Furthermore, the allowable range is established to be narrower as the degree of instability of the output of the O2 sensor 17 is becoming higher. The allowable range may be established in accordance with an operating condition of the engine including an engine start, an idling state, and cancellation of a fuel cut.

The determined air-fuel ratio error kcmd is added to the reference value FLAF/BASE to determine the target air-fuel ratio KCMD. The target air-fuel ratio KCMD is given to the exhaust system 19 (that is the object to be controlled), thereby causing the output Vo2/OUT of the O2 sensor to converge to the target value Vo2/TARGET.

Alternatively, the reference value FLAF/BASE of the air-fuel ratio may be variably updated in accordance with the adaptive law input Uadp determined by the sliding mode controller 74 after the limiting process of the limiter 75 is completed. More specifically, the reference value FLAF/BASE is initialized to the stoichiometric air-fuel ratio. If the adaptive law input Uadp exceeds a predetermined upper limit value, the reference value FLAF/BASE is increased by a predetermined amount. If the adaptive law input Uadp is below a predetermined lower limit value, the reference value FLAF/BASE is decreased by a predetermined amount. If the adaptive law input Uadp is between the upper and lower limit values, the reference value FLAF/BASE is not updated. The reference value FLAF/BASE thus updated is used in the next cycle. Thus, the reference value FLAF/BASE is adjusted to be a central value of variations in the target air-fuel ratio KCMD.

By performing the updating process of the reference value FLAF/BASE in combination with the limiting process, the allowable range of the demand error Usl is balanced between positive and negative values. It is preferable that the updating process for the reference value FLAF/BASE is performed when it is determined that the output Vo2/OUT of the O2 sensor substantially converges to the target value Vo2/TARGET and the sliding mode control is in a stable state.

As described above, the following measures are taken during the catalyst reduction mode so as to avoid, upon the shift of the control mode from the catalyst reduction mode to the adaptive control mode, a state in which the purification performance of the catalyst converter cannot be maintained in the optimal state shown by the window 27 due to improper limitations.

1) The integrated value of the switching function σ of the adaptive law input Uadp determined by the sliding mode controller 74 is held. In other words, the integrated value determined in a cycle immediately before the shift to the catalyst reduction mode is stored in a memory. The calculation of the integrated value is not performed during the catalyst reduction mode. When the control mode is shifted from the catalyst reduction mode to the adaptive control mode, the integrated value stored in the memory is again used.

2) The identification of model parameters performed by the identifier 72 is prohibited. In other wards, the model parameters determined in a cycle immediately before the shift to the catalyst reduction mode are stored in a memory. The identification process is not performed during the catalyst reduction mode. When the control mode is shifted from the catalyst reduction mode to the adaptive control mode, the model parameters stored in the memory are again used.

3) The updating process for the allowable range performed by the limiter 75 is prohibited. In other wards, the allowable range determined in a cycle immediately before the shift to the catalyst reduction mode is stored in a memory. The allowable range is not updated during the catalyst reduction mode. When the control mode is shifted from the catalyst reduction mode to the adaptive control mode, the allowable range stored in the memory is again used.

Flow of Catalyst Reduction Process

Referring to FIGS. 10 through 14, a flow of the reduction process performed by the reduction process part 33 shown in FIG. 3 will be described.

Figure 10:
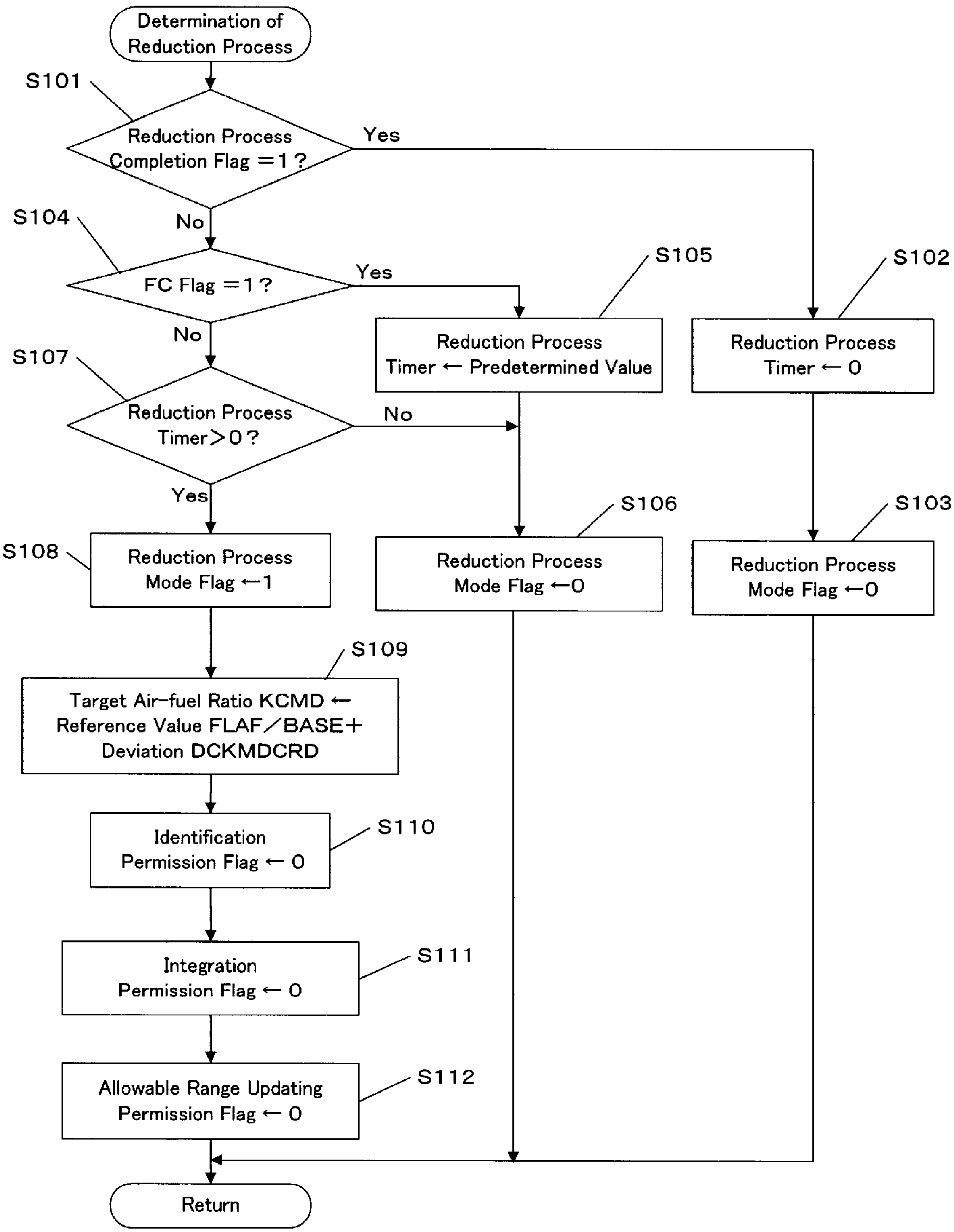
FIG. 10 is a flowchart showing a process for determining whether a reduction process is to be performed in accordance with one embodiment of the invention.

FIG. 10 shows a flowchart of a process for determining whether the reduction process is performed. In step S101, it is determined whether the value of a reduction process completion flag is 1. The completion flag is a flag that is to be set to 1 when the reduction process is completed. If the completion flag is 1, a reduction process timer is reset to zero (S102). A reduction process mode flag is reset to zero (S103).

If the completion flag is zero, the value of a fuel cut flag FC is examined (S104). If the fuel cut flag FC is 1, it indicates that the fuel cut is being performed. A predetermined value is set in the reduction process timer (S105) to activate the timer. The reduction process timer is an up timer that measures time from the start of the fuel cut to the completion of the reduction process. Then, the reduction process mode flag is set to zero (S106). Since the fuel cut is being performed, the reduction process is not yet started.

If the fuel cut flag is zero and the reduction process timer is greater than zero (S104 and S107), it indicates that the process is in the reduction process mode initiated when the fuel cut is cancelled. The process proceeds to step S108, in which the reduction process mode flag is set to 1 to perform the reduction process.

If the reduction process timer is zero in step S107, it indicates that the process is not in the reduction process mode. The reduction process mode flag is set to zero (S106). The process exits the catalyst reduction mode.

When the reduction process is performed, the target air-fuel ratio KCMD is determined in accordance with the above-described equation (1). The process proceeds to step S110, in which the identification permission flag is set to zero to prohibit calculating the identification parameters a1, a2 and b1 in the adaptive air-fuel ratio control. At this time, the current identification parameters are stored in a memory. The process proceeds to step S111, in which an integration permission flag is set to zero to prohibit calculating the integrated value $\Sigma\sigma$ of the adaptive law input in the adaptive air-fuel ratio control. At this time, the current integrating term $\Sigma\sigma$ is stored in a memory. The process proceeds to step S112, in which the allowable range updating permission flag is set to zero to prohibit updating the allowable range used by the limiter in the adaptive air-fuel ratio control.

Figure 11:
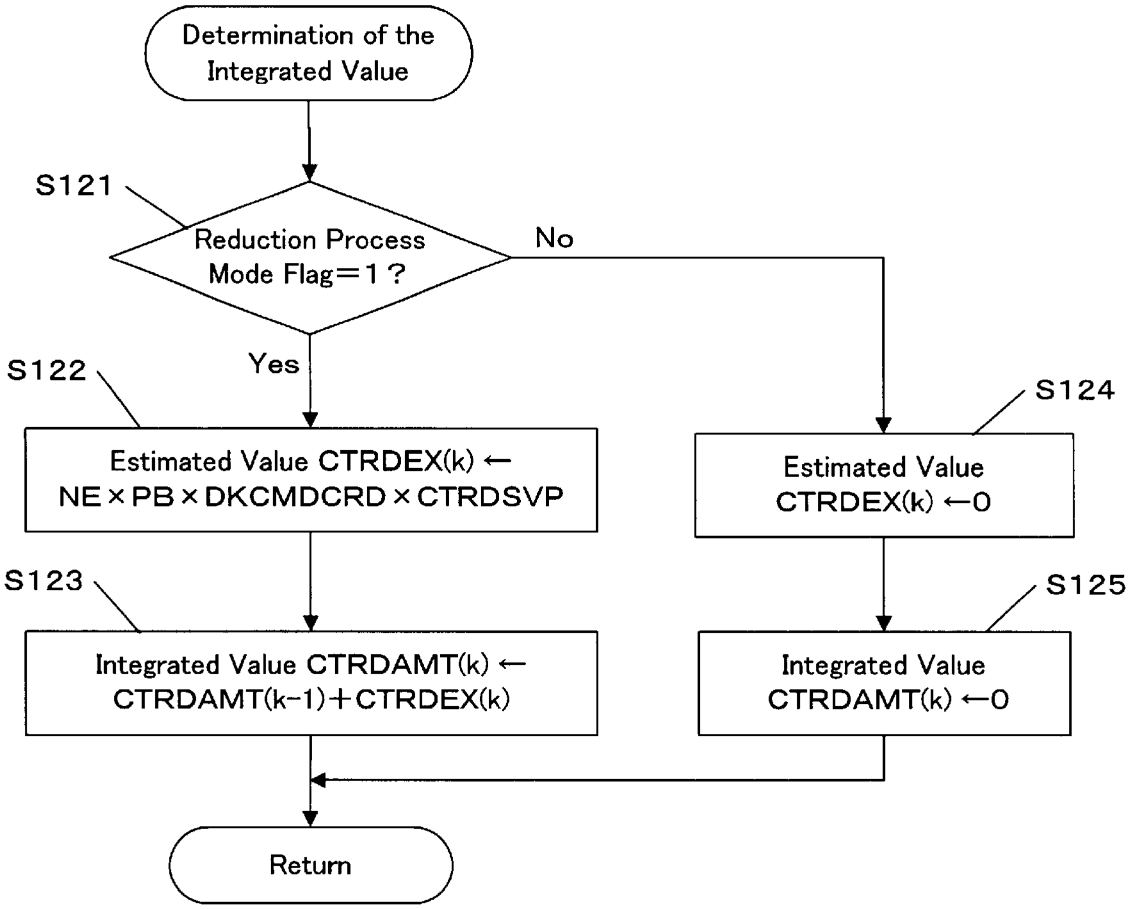
FIG. 11 is a flowchart showing a process for determining an integrated value of a reduction gas amount in accordance with one embodiment of the invention.

FIG. 11 is a flowchart of a process for determining the integrated value CTRAMT of the reduction gas amount. In step S121, the reduction process mode flag is examined. If the reduction process mode flag is 1, it indicates that the reduction process is being performed. The process proceeds to step S122, in which the reduction gas amount in the current cycle is estimated in accordance with the above equation (2). The process proceeds to step S123, in which the accumulated value of the estimated reduction gas amount for the current cycle is determined in accordance with the equation (3).

If the reduction process mode flag is zero (S121), the estimated value and the integrated value of the reduction gas amount in the current cycle are set to zero (S124 and S125).

Figure 12:
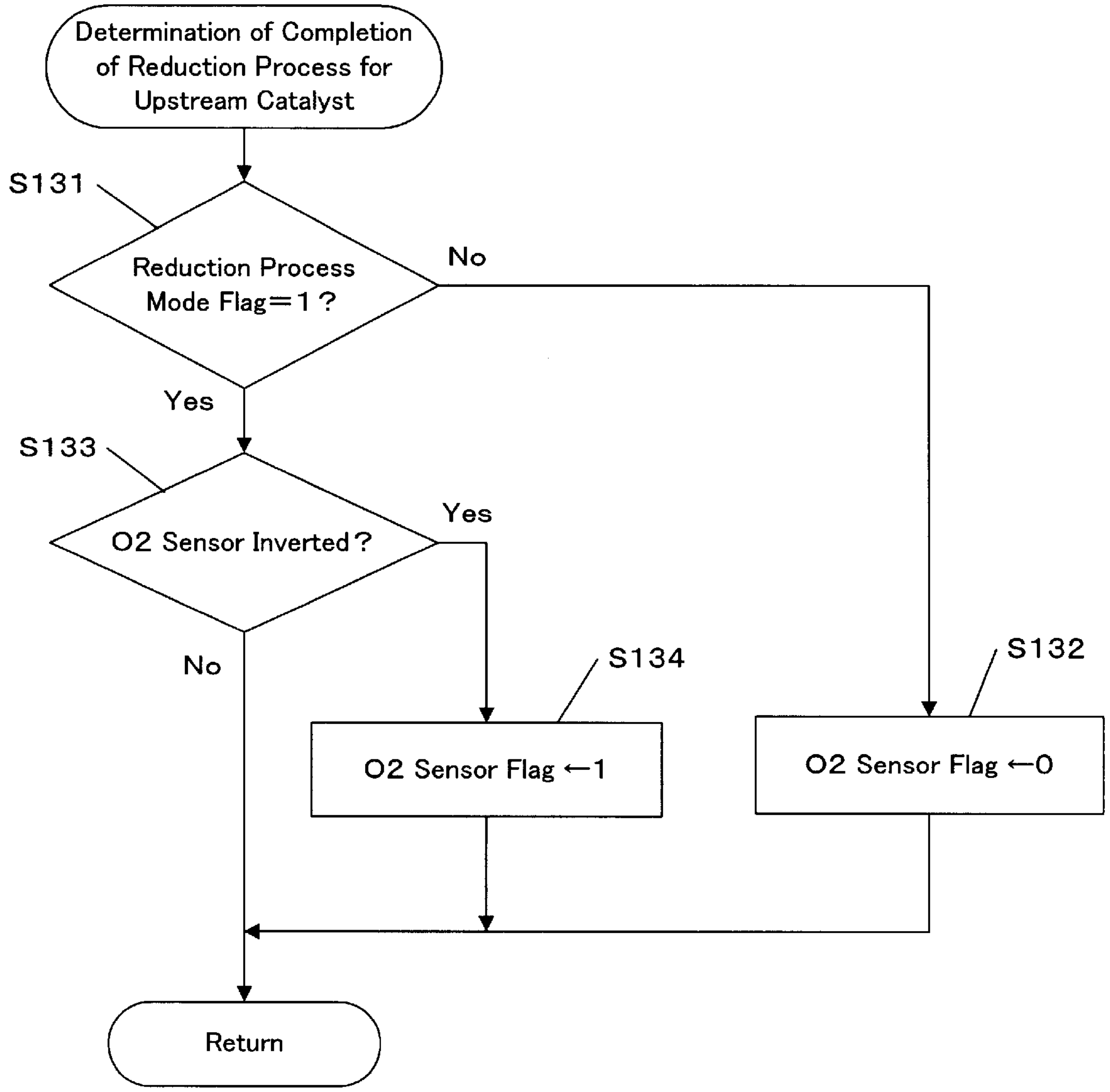
FIG. 12 is a flowchart showing a process for determining whether a reduction process for an upstream catalyst is completed in accordance with one embodiment of the invention.

FIG. 12 is a flowchart of a process for determining whether the reduction process for the upstream catalyst is completed. In step S131, the reduction process mode flag is examined. If the reduction process mode flag is zero, it indicates that the reduction process is not being performed. The process proceeds to step S132, in which the O2 sensor flag F_SO2RD (FIG. 5) is set to zero to indicate that the reduction process is not yet completed.

If the reduction process mode flag is 1, it is determined whether the output of the O2 sensor 17 has been inverted (S133). If the output of the O2 sensor 17 is greater than a predetermined value, it may be determined that the output of the O2 sensor 17 has been inverted from zero to 1. If the output of the O2 sensor 17 has been inverted, it indicates that the reduction process for the upstream catalyst is completed. The O2 sensor flag F_SO2RD is set to 1 (S134).

Figure 13:
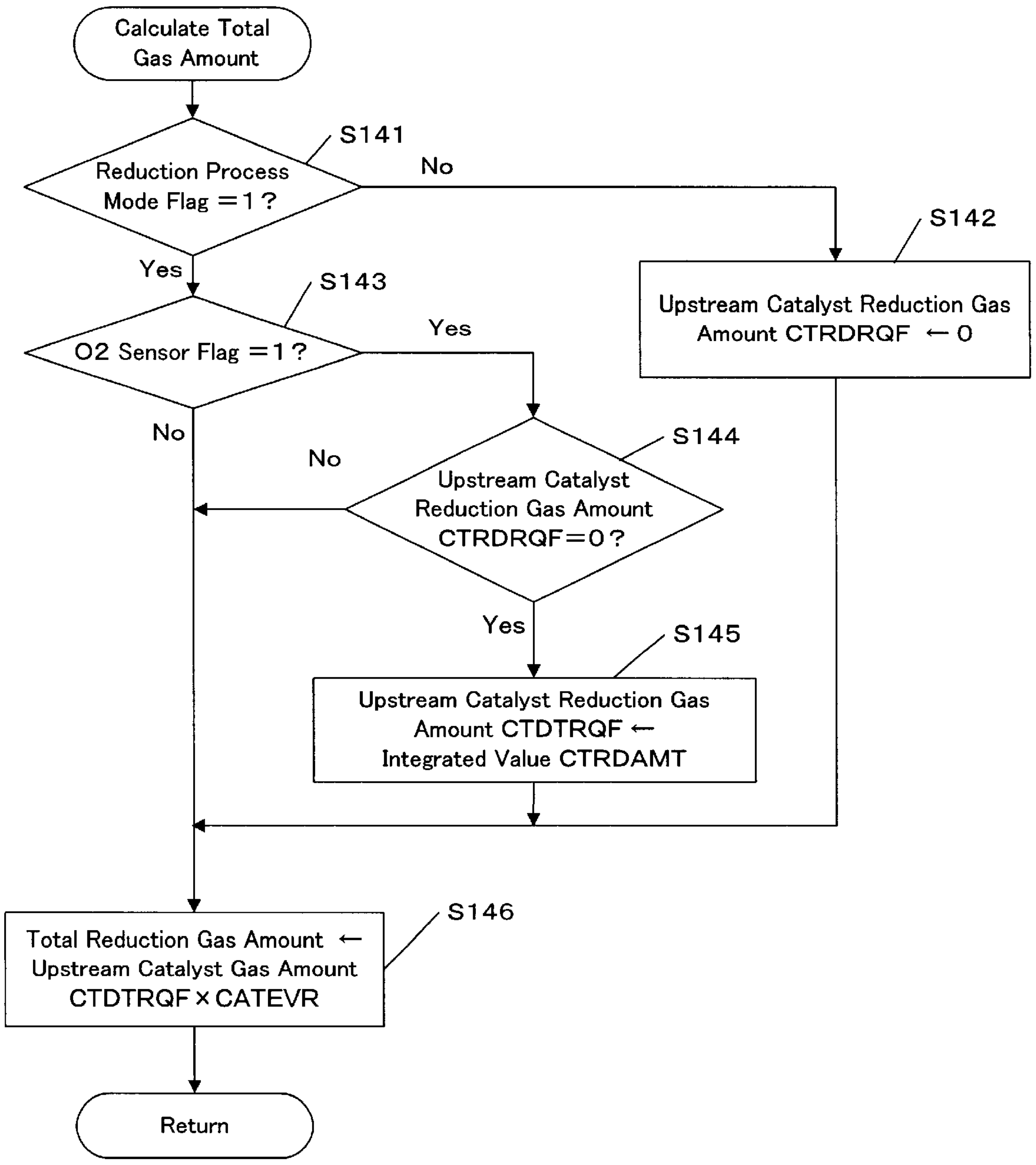
FIG. 13 is a flowchart showing a process for determining a total gas amount required to reduce an entire catalyst converter in accordance with one embodiment of the invention.

FIG. 13 is a flowchart of a process for determining the gas amount CTRDRQF necessary to reduce the upstream catalyst, and the total gas amount CTRDRQT necessary to reduce the entire catalyst (upstream and downstream catalysts). In step S141, the reduction process mode flag is examined. If the reduction process mode flag is zero, the gas amount CTRDRQF for the upstream catalyst reduction is set to zero (S142).

If the reduction process mode flag is 1, the O2 sensor flag is examined. If the value of the O2 sensor flag is 1, it indicates that the reduction process for the upstream catalyst is completed. The process proceeds to step S144, in which it is determined whether the reduction gas amount CTRDRQF for the upstream catalyst is zero. If the reduction gas amount CTRDRQF is zero, it indicates that the reduction process for the upstream catalyst has been completed in the previous cycle. The process proceeds to step S145, in which the current accumulated value CTRAMT is set in the upstream catalyst reduction gas amount CTRDRQF.

In step S143, if the O2 sensor flag is zero, it indicates that the reduction process for the upstream catalyst is not completed. If the upstream catalyst reduction gas amount CTRDRQF is not zero in step S144, it indicates that the gas amount CTRDRQF has already been determined. The process proceeds to step S146, in which the total gas amount CTRDRQT necessary to reduce both the upstream and downstream catalysts is determined.

Figure 14:
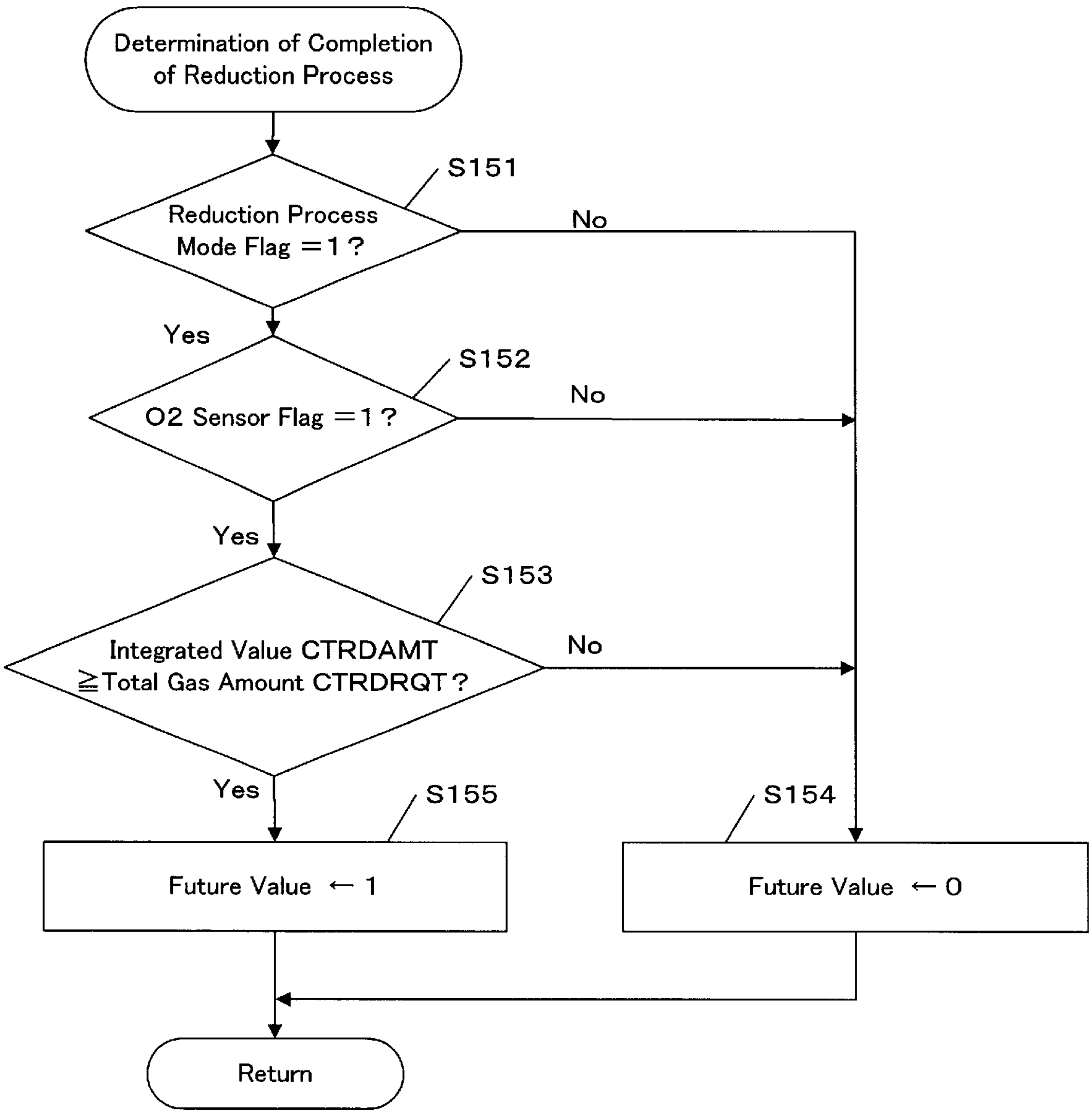
FIG. 14 is a flowchart showing a process for determining whether a reduction process is completed in accordance with one embodiment of the invention.

FIG. 14 is a flowchart of a process for determining whether the reduction process for the entire catalyst is completed. When the value of the reduction process mode flag is zero, it indicates that the reduction process is not being performed. If the value of the O2 sensor flag is zero, it indicates that the reduction process for the upstream catalyst is not completed. If the accumulated value CTRAMT is smaller than the total gas amount CTRDRQT, it indicates that the reduction process for the downstream catalyst is not completed. In such cases, the process proceeds to step S154, in which the future value of the virtual O2 sensor 30 is set to zero.

If the value of the reduction process mode flag is 1, the process proceeds to step S152, in which the value of the O2 sensor flag is examined. If the value of the O2 sensor flag is 1, the process proceeds to step S153, in which it is determined whether the accumulated value CTRAMT has reached the total gas amount CTRDRQT. If the accumulated value CTRAMT has reached the total gas amount CTRDRQT, it indicates that the reduction process for the downstream catalyst is completed. In other words, it means the reduction process for the entire catalyst is completed. The process proceeds to step S155, in which the future value of the virtual O2 sensor 30 is set to 1. The process exits the reduction process mode.

The embodiments of the present invention described above are applicable when the air-fuel ratio is shifted from a lean state to a normal fuel supply state. For example, when engine operation is switched from lean-burn operation to stoichiometric air-fuel ratio operation, the catalyst reduction process mode is started in response to a signal indicative of cancellation of the lean-burn operation. After the reduction process for the entire catalyst is completed, the control mode is shifted to the adaptive control mode. In this case, even if a catalyst having a function of absorbing Nox is used during the lean-burn operation, it is possible to perform the reduction process by appropriately setting the coefficient CATEVR.

According to the present invention, it is possible to keep track of the atmosphere of the downstream catalyst during purification based on the estimated output of the virtual O2 sensor. Utilizing this feature, it is possible to switch between the adaptive air-fuel ratio control based on the output of the O2 sensor provided between the upstream and downstream catalysts and the air-fuel ratio control based on the estimated output of the virtual O2 sensor. For example, when the internal combustion engine operates under a higher load condition, the air-fuel ratio control may be switched in accordance with the estimated output of the virtual O2 sensor to maximize the purification rate of HC.

What is claimed is:

1. An air-fuel ratio controller of an internal combustion engine, the air-fuel ratio controller comprising:

an exhaust gas sensor provided between an upstream catalyst and a downstream catalyst that are disposed in an exhaust manifold, the upstream catalyst being disposed upstream of the exhaust gas sensor and the downstream catalyst being disposed downstream of the exhaust gas sensor;

a virtual exhaust gas sensor virtually provided downstream of the downstream catalyst; and a control unit configured to estimate an estimated output of the virtual exhaust gas sensor based on a gas amount that contributes to reduction of the upstream and downstream catalysts and a detected output of the exhaust gas sensor provided between the upstream and downstream catalysts after an operating condition in which an air-fuel ratio is lean is cancelled, or after a fuel cut is cancelled, and to perform first air-fuel ratio control for controlling the air-fuel ratio of the engine in accordance with the estimated output.

2. The air-fuel ratio controller of claim 1, wherein the gas amount that contributes to the reduction of the upstream and downstream catalysts is estimated based on an operating condition of the engine.

3. The air-fuel ratio controller of claim 1, wherein the first air-fuel ratio control changes the air-fuel ratio to a predetermined rich value when the operating condition in which the air-fuel ratio is lean is cancelled or when the fuel cut is cancelled, wherein the gas amount that contributes to the reduction of the upstream and downstream catalysts is estimated based on the amount of the change in the air-fuel ratio.

4. The air-fuel ratio controller of claim 1, wherein the estimated output of the virtual exhaust gas sensor is expressed by a binary digit, the binary digit indicating a lean state in which the air-fuel ratio is leaner than a predetermined air-fuel ratio, or indicating a rich state in which the air-fuel ratio is richer than the predetermined air-fuel ratio.

5. The air-fuel ratio controller of claim 1, wherein the estimated output of the virtual exhaust gas sensor is a future value, the future value temporally precedes a detected value that would be detected by the virtual exhaust gas sensor when the virtual exhaust gas sensor is provided downstream of the downstream catalyst.

6. The air-fuel ratio controller of claim 1, wherein the control unit is further configured to perform second air-fuel control for controlling the air-fuel ratio based on the detected output of the exhaust gas sensor provided between the upstream and downstream catalysts, wherein the control unit switches between the first air-fuel ratio control and the second air-fuel ratio control in accordance with a predetermined condition.

7. The air-fuel ratio controller of claim 6, wherein the predetermined condition includes the estimated output of the virtual exhaust gas sensor being inverted from lean to rich, wherein the control unit switches the first air-fuel ratio control to the second air-fuel ratio control in response to the estimated output of the virtual exhaust gas sensor being inverted from lean to rich.

8. The air-fuel ratio controller of claim 6, wherein the second air-fuel ratio control includes a determination of an integration term included in a manipulated quantity for manipulating the air-fuel ratio, and wherein the determination of the integration term is prohibited when the air-fuel ratio is controlled by the first air-fuel ratio control.

9. The air-fuel ratio controller of claim 6, wherein the second air-fuel ratio control includes an identification of a parameter used to determine the air-fuel ratio in each cycle, and wherein the identification of the parameter is prohibited when the air-fuel ratio is controlled by the first air-fuel ratio control.

10. The air-fuel ratio controller of claim 6, wherein the second air-fuel ratio control includes:

limiting a manipulated quantity within a predetermined range, the manipulated quantity manipulating the air-fuel ratio; and variably updating the predetermined range in accordance with the determined manipulated quantity, wherein the update of the predetermined range is prohibited when the air-fuel ratio is controlled by the first air-fuel ratio control.

11. The air-fuel controller of claim 1, wherein the control unit is further configured to:

accumulate a gas amount that contributes to the reduction of the upstream and downstream catalysts in each cycle;

identify as a gas amount necessary to reduce the upstream catalyst the accumulated gas amount at the time when the detected output of the exhaust gas sensor provided between the upstream and downstream catalysts is inverted;

estimate a total gas amount necessary to reduce both the upstream and downstream catalysts based on the identified gas amount necessary to reduce the upstream catalyst; and manipulate the output of the virtual exhaust gas sensor to indicate a completion of the first air-fuel ratio control if the accumulated gas amount reaches the estimated total gas amount.

12. A method for controlling an air-fuel ratio of an internal combustion engine, the method comprising the steps of:

an exhaust gas sensor provided between an upstream catalyst and a downstream catalyst that are disposed in an exhaust manifold, the upstream catalyst being disposed upstream of the exhaust gas sensor and the downstream catalyst being disposed downstream of the exhaust gas sensor;

virtually providing a virtual exhaust gas sensor downstream of the downstream catalyst;

estimating an estimated output of the virtual exhaust gas sensor based on a gas amount that contributes to reduction of the upstream and downstream catalysts, and a detected output of the exhaust gas sensor provided between the upstream and downstream catalysts after an operating condition in which an air-fuel ratio is lean is cancelled, or after a fuel cut is cancelled, and performing a first air-fuel ratio control for controlling the air-fuel ratio of the engine in accordance with the estimated output.

13. The method of claim 12, wherein the step of estimating the estimated output comprises the step of determining the gas amount based on an operating condition of the engine.

14. The method of claim 12, wherein the step of performing the first air-fuel ratio control comprises the steps of:

changing the air-fuel ratio to a predetermined rich value when the operating condition in which the air-fuel ratio is lean is cancelled or when the fuel cut is cancelled; and determining the gas amount based on the amount of the change in the air-fuel ratio.

15. The method of claim 12, wherein the estimated output is expressed by a binary digit indicating a lean state in which the air-fuel ratio is leaner than a predetermined air-fuel ratio, or indicating a rich state in which the air-fuel ratio is richer than the predetermined air-fuel ratio.

16. The method of claim 12, wherein the step of estimating estimates a future value, the future value temporally precedes a detected value that would be detected by the virtual exhaust gas sensor when the virtual exhaust gas sensor is provided downstream of the downstream catalyst.

17. The method of claim 12, further comprising the steps of:

performing second air-fuel control for controlling the air-fuel ratio based on the detected output of the exhaust gas sensor provided between the upstream and downstream catalysts; and switching between the first air-fuel ratio control and the second air-fuel ratio control in accordance with a predetermined condition.

18. The method of claim 17, wherein the step of switching comprises the steps of:

inverting the estimated output of the virtual exhaust gas sensor from lean to rich; and switching from the first air-fuel ratio control to the second air-fuel ratio control in response to the step of inverting the estimated output, wherein the predetermined condition includes the estimated output of the virtual exhaust gas sensor being inverted from lean to rich.

19. The method of claim 17, wherein the step of performing the second air-fuel ratio control comprises the steps of:

determining an integration term included in a manipulated quantity for manipulating the air-fuel ratio; and prohibiting the step of determining the integration term when the air-fuel ratio is controlled by the first air-fuel ratio control.

20. The method of claim 17, wherein the step of performing the second air-fuel ratio control comprises the steps of:

identifying a parameter used to determine the air-fuel ratio in each cycle; and prohibiting the step of identifying the parameter when the air-fuel ratio is controlled by the first air-fuel ratio control.

21. The method of claim 17, wherein the second air-fuel ratio control comprises the steps of:

limiting a manipulated quantity within a predetermined range, the manipulated quantity manipulating the air-fuel ratio; and variably updating the predetermined range in accordance with the determined manipulated quantity; and prohibiting the step of updating the predetermined range when the air-fuel ratio is controlled by the first air-fuel ratio control.

22. The method of claim 12, further comprising the steps of:

accumulating a gas amount that contributes to the reduction of the upstream and downstream catalysts in each cycle;

identifying as a gas amount necessary to reduce the upstream catalysts, the accumulated gas amount at a time when the detected output of the exhaust gas sensor provided between the upstream and downstream catalysts is inverted;

estimating a total gas amount necessary to reduce both the upstream and downstream catalysts based on the identified gas amount necessary to reduce the upstream catalyst; and manipulating the output of the virtual exhaust gas sensor to indicate a completion of the first air-fuel ratio control if the accumulated gas amount reaches the estimated total gas amount.

23. A computer-readable medium including a computer program executable on a computer system for controlling an air-fuel ratio of an internal combustion engine, the computer program performing the steps of:

receiving a sensor output of an exhaust gas sensor provided between an upstream catalyst and a downstream catalyst that are disposed in an exhaust manifold, the upstream catalyst being disposed upstream of the exhaust gas sensor and the downstream catalyst being disposed downstream of the exhaust gas sensor;

estimating an estimated output of a virtual exhaust gas sensor based on a gas amount that contributes to reduction of the upstream and downstream catalysts and a received sensor output of the exhaust gas sensor provided between the upstream and downstream catalysts, the virtual exhaust gas sensor virtually provided downstream of the downstream catalyst after an operating condition in which an air-fuel ratio is lean is cancelled, or after a fuel cut is cancelled; and performing first air-fuel ratio control for controlling the air-fuel ratio of the engine in accordance with the estimated output.

24. The computer-readable medium of claim 23, wherein the step of estimating the estimated output comprises the step of determining the gas amount based on an operating condition of the engine.

25. The computer-readable medium of claim 23, wherein the step of performing the first air-fuel ratio control comprises the step of:

changing the air-fuel ratio to a predetermined rich value when the operating condition in which the air-fuel ratio is lean is cancelled or when the fuel cut is cancelled; and determining the gas amount based on the amount of the change in the air-fuel ratio.

26. The computer-readable medium of claim 23, wherein the estimated output is expressed by a binary digit indicating a lean state in which the air-fuel ratio is leaner than a predetermined air-fuel ratio, or indicating a rich state in which the air-fuel ratio is richer than the predetermined air-fuel ratio.

27. The computer-readable medium of claim 23, wherein the step of estimating estimates a future value, and the future value temporally precedes a detected value that would be detected by the virtual exhaust gas sensor when the virtual exhaust gas sensor is provided downstream of the downstream catalyst.

28. The computer-readable medium of claim 23, the program further comprising the steps of:

performing second air-fuel control for controlling the air-fuel ratio based on the received sensor output of the exhaust gas sensor provided between the upstream and downstream catalysts; and switching between the first air-fuel ratio control and the second air-fuel ratio control in accordance with a predetermined condition.

29. The computer-readable medium of claim 28, wherein the step of switching comprises the steps of:

inverting the estimated output of the virtual exhaust gas sensor from lean to rich; and switching from the first air-fuel ratio control to the second air-fuel ratio control in response to the step of inverting the estimated output, wherein the predetermined condition includes the estimated output of the virtual exhaust gas sensor being inverted from lean to rich.

30. The computer-readable medium of claim 28, wherein the second air-fuel ratio control comprises the steps of:

determining an integration term included in a manipulated quantity for manipulating the air-fuel ratio; and prohibiting the step of determining the integration term when the air-fuel ratio is controlled by the first air-fuel ratio control.

31. The computer-readable medium of claim 28, wherein the step of performing the second air-fuel ratio control comprises the steps of:

identifying a parameter used to determine the air-fuel ratio in each cycle; and prohibiting the step of identifying the parameter when the air-fuel ratio is controlled by the first air-fuel ratio control.

32. The computer-readable medium of claim 28, wherein the step of performing the second air-fuel ratio control comprises the steps of:

limiting a manipulated quantity within a predetermined range, the manipulated quantity manipulating the air-fuel ratio; and variably updating the predetermined range in accordance with the determined manipulated quantity; and prohibiting the step of updating the predetermined range when the air-fuel ratio is controlled by the first air-fuel ratio control.

33. The computer-readable medium of claim 23, the program further performing the steps of:

accumulating a gas amount that contributes to the reduction of the upstream and downstream catalysts in each cycle;

identifying as a gas amount necessary to reduce the upstream catalysts, the accumulated gas amount at a time when the detected output of the exhaust gas sensor provided between the upstream and downstream catalysts is inverted;

estimating a total gas amount necessary to reduce both the upstream and downstream catalysts based on the identified gas amount necessary to reduce the upstream catalyst; and manipulating the output of the virtual exhaust gas sensor to indicate a completion of the first air-fuel ratio control if the accumulated gas amount reaches the estimated total gas amount.

* * * * *